(12) United States Patent
Zhang et al.

(10) Patent No.: US 11,469,525 B2
(45) Date of Patent: Oct. 11, 2022

(54) ANTENNA SYSTEM, FEEDING NETWORK RECONFIGURATION METHOD, AND APPARATUS

(71) Applicant: HUAWEI TECHNOLOGIES CO., LTD., Shenzhen (CN)

(72) Inventors: Guanxi Zhang, Shanghai (CN); Long Shen, Shanghai (CN); Yongyong Wang, Shanghai (CN); Zhongming Qin, Shanghai (CN); Jianping Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/073,387

(22) Filed: Oct. 18, 2020

(65) Prior Publication Data

US 2021/0036437 A1 Feb. 4, 2021

Related U.S. Application Data

(63) Continuation of application No. PCT/CN2019/079760, filed on Mar. 26, 2019.

(30) Foreign Application Priority Data

Apr. 18, 2018 (CN) .......................... 201810351693.7

(51) Int. Cl.
*H01Q 21/24* (2006.01)
*H01Q 21/00* (2006.01)
(Continued)

(52) U.S. Cl.
CPC ....... *H01Q 21/245* (2013.01); *H01Q 21/0006* (2013.01); *H01Q 21/28* (2013.01); *H01Q 21/293* (2013.01)

(58) Field of Classification Search
CPC .. H01Q 21/0006; H01Q 21/24; H01Q 21/245; H01Q 21/29; H01Q 21/293;
(Continued)

(56) References Cited

U.S. PATENT DOCUMENTS 5,990,830 A 11/1999 Vail et al.
2010/0066631 A1 3/2010 Puzella et al.
(Continued)

FOREIGN PATENT DOCUMENTS

CN 1898885 A 1/2007
CN 100420166 C 9/2008
(Continued)

OTHER PUBLICATIONS

Sau-Hsuan Wu et al: "Reconfigurable Hybrid Beamforming for Dual Polarized mmWave MIMO Channels: Stochastic Channel Modeling and Architectural Adaptation Methods", Feb. 1, 2018 (Feb. 1, 2018), pp. 741-755, XP055682361.

*Primary Examiner* — Jason Crawford
(74) *Attorney, Agent, or Firm* — Rimon PC

(57) ABSTRACT

An antenna system, a feeding network reconfiguration method, and an apparatus is disclosed. The antenna system may include an antenna array, a reconfigurable network unit, a control unit, and K radio frequency channels. The antenna array may include L antenna subarrays, and the reconfigurable network unit may divide the L antenna subarrays into M antenna subarray groups, and separately connect the M antenna subarray groups to the K radio frequency channels; any one of the K radio frequency channels may perform signal processing on a signal received by a connected antenna subarray group and/or a to-be-transmitted signal; and the control unit may control the reconfigurable network
(Continued)

unit to adjust a mapping relationship between an antenna subarray group connected to each radio frequency channel and the antenna subarrays.

15 Claims, 25 Drawing Sheets

(51) Int. Cl.
*H01Q 21/29* (2006.01)
*H01Q 21/28* (2006.01)

(58) Field of Classification Search
CPC ........ H01Q 25/00; H01Q 25/002; H01Q 3/30; H01Q 3/36; H01Q 3/40; H04B 7/02; H04B 7/0617; H04B 7/10
See application file for complete search history.

(56) References Cited

U.S. PATENT DOCUMENTS

| | | | |
|---|---|---|---|
| 2010/0117913 A1* | 5/2010 | Jung | H01Q 1/246 343/724 |
| 2014/0210666 A1* | 7/2014 | Maltsev | H01Q 3/40 343/893 |
| 2017/0276770 A1* | 9/2017 | Lin | H01Q 25/002 |
| 2018/0199258 A1* | 7/2018 | Cezanne | H04W 40/06 |
| 2020/0328787 A1* | 10/2020 | Wang | H04B 7/0608 |
| 2020/0395683 A1* | 12/2020 | Cao | H01Q 9/0442 |
| 2021/0036437 A1* | 2/2021 | Zhang | H01Q 21/245 |
| 2021/0194124 A1* | 6/2021 | Kim | H04B 7/0695 |

FOREIGN PATENT DOCUMENTS

| | | |
|---|---|---|
| CN | 101394019 A | 3/2009 |
| CN | 102522632 A | 6/2012 |
| CN | 202871981 U | 4/2013 |
| CN | 205355262 U | 6/2016 |
| CN | 105958214 A | 9/2016 |
| CN | 106559107 A | 4/2017 |
| CN | 106848579 A | 6/2017 |
| CN | 107516769 A | 12/2017 |
| CN | 107733536 A | 2/2018 |
| EP | 3277014 A1 | 1/2018 |
| EP | 3285422 A1 | 2/2018 |
| WO | 2013190369 A2 | 12/2013 |

* cited by examiner

CONT. FROM FIG. 7B

Beam coverage effect 1

Relatively wide horizontal coverage

Relatively wide vertical coverage

CONT. FROM FIG. 7B

CONT. FROM FIG. 7B

Beam coverage effect 2

Relatively wide horizontal coverage

Wide vertical coverage

ANTENNA SYSTEM, FEEDING NETWORK RECONFIGURATION METHOD, AND APPARATUS

CROSS-REFERENCE TO RELATED APPLICATIONS

This application is a continuation of International Application No. PCT/CN2019/079760, filed on Mar. 26, 2019, which claims priority to Chinese Patent Application No. 201810351693.7, filed on Apr. 18, 2018. The disclosures of the aforementioned applications are hereby incorporated by reference in their entireties.

TECHNICAL FIELD

This application relates to the field of communications technologies, and in particular, to an antenna system, a feeding network reconfiguration method, and an apparatus.

BACKGROUND

An antenna is one of key components of various wireless communications systems. A mobile communications antenna system mainly includes an antenna, a feeder cable, and a radio frequency channel. An antenna on the top of a tower is connected to a lower radio frequency channel through a feeder cable of a particular length. In a downlink, a signal of a transmitter in the radio frequency channel is fed, through the feeder cable, into the antenna installed on the top of the tower and then transmitted to the air. In an uplink, a mobile phone signal is received by the antenna on the top of the tower and then transmitted, through the feeder cable, to a receiver in the radio frequency channel under the tower.

In current mobile communication, a large antenna array can overcome, due to a high gain, a path loss of multipath transmission, to meet requirements of 5G communication in scenarios such as backhaul and mobility. In the mobile communications antenna system, when a quantity of radio frequency channels is relatively small, the radio frequency channels are generally concentrated in a horizontal dimension, and each radio frequency channel is connected to one antenna subarray that is of an antenna array and that includes a plurality of antenna radiating elements in a vertical direction. Therefore, the mobile communications antenna system can perform beam scanning horizontally, so that beams in 120 degrees of a horizontal plane can all be covered. However, there is generally one fixed beam in the vertical direction, and consequently, when users are distributed in the vertical direction, for example, in a high building, beam coverage effects of some floors is poor.

Therefore, how to improve flexibility of beam coverage of the mobile communications antenna system becomes a technical problem that is being studied by a person skilled in the art.

SUMMARY

This application provides an antenna system, a feeding network reconfiguration method, and an apparatus, to dynamically adjust beam coverage of the antenna system.

According to a first aspect, this application provides an antenna system. The antenna system includes an antenna array, a control unit, a reconfigurable network unit, and K radio frequency channels.

The antenna array includes L antenna subarrays, where L is a positive integer greater than 1.

The reconfigurable network unit is configured to: divide the L antenna subarrays into M antenna subarray groups, and separately connect the M antenna subarray groups to the K radio frequency channels, where one polarization direction of one antenna subarray group is connected to one radio frequency channel; and M is a positive integer, and K is an integer multiple of M.

Any one of the K radio frequency channels is configured to perform signal processing on a signal received by a connected antenna subarray group and/or a to-be-transmitted signal.

The control unit is configured to control the reconfigurable network unit to adjust a mapping relationship between an antenna subarray group connected to at least one of the K radio frequency channels and the antenna subarrays.

According to this embodiment of this application, the control unit in the antenna system controls the reconfigurable network unit to change a network state and adjust a mapping relationship between an antenna subarray group connected to each radio frequency channel and the antenna subarrays, to change a quantity of radiating elements in a horizontal direction and/or a vertical direction in the antenna subarray group connected to each radio frequency channel, or may change distribution status of the radio frequency channels in the horizontal direction and/or the vertical direction, to change coverage of a beam generated by the antenna subarray group connected to the at least one of the K radio frequency channels. A larger quantity of radiating elements in the horizontal direction in an antenna subarray group indicates a narrower beam width on a horizontal plane of a beam generated by the antenna subarray group, and a larger quantity of radiating elements in the vertical direction in the antenna subarray group indicates a narrower beam width of the beam generated by the antenna subarray group. Therefore, a width of a beam generated by the antenna subarray group connected to each radio frequency channel and a beam direction of a beam generated by an antenna subarray group connected to each of the K radio frequency channels may be adjusted. Beam coverage of the antenna system may be dynamically adjusted by adjusting the beam width and the beam direction.

With reference to the first aspect, in a first possible implementation of the first aspect, that the control unit is configured to control the reconfigurable network unit to adjust a mapping relationship between an antenna subarray group connected to at least one of the K radio frequency channels and the antenna subarrays is specifically: The control unit is configured to control the reconfigurable network unit to adjust a quantity X of antenna subarray groups in a horizontal direction connected to the K radio frequency channels, where beams generated in a same polarization direction of the X antenna subarray groups in the horizontal direction include E directions in the horizontal direction, both X and E are positive integers, and $1 \le E \le X \le M$. In other words, in this embodiment of this application, the control unit may control the reconfigurable network unit to adjust the quantity of the antenna subarray groups in the horizontal direction connected to the K radio frequency channels. When each polarization of the antenna array corresponds, in the horizontal direction, to antenna subarray groups separately connected to a plurality of radio frequency channels, each polarization of the antenna system may perform multi-direction beam covering in the horizontal direction. When each polarization of the antenna array corresponds, in the horizontal direction, to an antenna subarray group connected to a single radio frequency channel, the antenna system may perform single-direction beam covering in the horizontal direction. Therefore, horizontal coverage of a beam of the antenna system may be changed by adjusting the quantity of the antenna subarray groups in the horizontal direction connected to the K radio frequency channels.

With reference to the first aspect or the first possible implementations of the first aspect, in a second possible implementation of the first aspect, that the control unit is configured to control the reconfigurable network unit to adjust a mapping relationship between an antenna subarray group connected to at least one of the K radio frequency channels and the antenna subarrays is specifically: The control unit is configured to control the reconfigurable network unit to adjust a quantity Y of antenna subarray groups in a vertical direction connected to the K radio frequency channels, where beams generated in a same polarization direction of the Y antenna subarray groups in the vertical direction include F directions in the vertical direction, both Y and F are positive integers, and $1 \leq F \leq Y \leq M$. In other words, in this embodiment of this application, the control unit may control the reconfigurable network unit to adjust the quantity of the antenna subarray groups in the vertical direction connected to the K radio frequency channels. When each polarization of the antenna array corresponds, in the vertical direction, to antenna subarray groups separately connected to a plurality of radio frequency channels, each polarization of the antenna system may perform multi-direction beam covering in the vertical direction. When each polarization of the antenna array corresponds, in the vertical direction, to an antenna subarray group connected to a single radio frequency channel, the antenna system may perform single-direction beam covering in the vertical direction. Therefore, vertical coverage of the beam of the antenna system may be changed by adjusting the quantity of the antenna subarray groups in the vertical direction connected to the K radio frequency channels.

With reference to the first aspect or any one of the foregoing possible implementations of the first aspect, in a third possible implementation of the first aspect, that the control unit is configured to control the reconfigurable network unit to adjust a mapping relationship between an antenna subarray group connected to at least one of the K radio frequency channels and the antenna subarrays is specifically: The control unit is configured to control the reconfigurable network unit to adjust a quantity of antenna subarrays in the horizontal direction included in the antenna subarray group connected to the at least one of the K radio frequency channels, where beams generated by antenna subarray groups that include different quantities of antenna subarrays in the horizontal direction have different widths in the horizontal direction. In other words, in this embodiment of this application, the quantity of the antenna subarrays in the horizontal direction included in the antenna subarray group connected to the radio frequency channel is changed. Because a larger quantity of antenna subarrays in the horizontal direction in an antenna subarray group indicates a narrower horizontal width of a beam generated by the antenna subarray group, coverage in the horizontal direction of the beam may be changed.

With reference to the first aspect or any one of the foregoing possible implementations of the first aspect, in a fourth possible implementation of the first aspect, that the control unit is configured to control the reconfigurable network unit to adjust a mapping relationship between an antenna subarray group connected to at least one of the K radio frequency channels and the antenna subarrays is specifically: The control unit is configured to control the reconfigurable network unit to adjust a quantity of antenna subarrays in the vertical direction included in the antenna subarray group connected to the at least one of the K radio frequency channels, where beams generated by antenna subarray groups that include different quantities of antenna subarrays in the vertical direction have different widths in the vertical direction. In other words, in this embodiment of this application, the quantity of the antenna subarrays in the vertical direction included in the antenna subarray group connected to the radio frequency channel is adjusted. Because a larger quantity of antenna subarrays in the vertical direction in an antenna subarray group indicates a narrower vertical width of a beam generated by the antenna subarray group, coverage in the vertical direction of the beam may be changed.

With reference to the first aspect or any one of the foregoing possible implementations of the first aspect, in a fifth possible implementation of the first aspect, the control unit is further configured to control the reconfigurable network unit to adjust a spacing between antenna subarrays in the antenna subarray group connected to the at least one of the K radio frequency channels. In other words, in this embodiment of this application, a horizontal spacing between the antenna subarrays in the antenna subarray group connected to the radio frequency channel is changed, to change a width of the beam generated by the antenna subarray group connected to the at least one radio frequency channel. Because a larger horizontal distance between antenna subarrays connected to one radio frequency channel indicates a narrower horizontal width of a radio frequency channel beam, and a larger vertical spacing between antenna subarrays connected to one radio frequency channel indicates a narrower vertical width of a radio frequency channel beam, coverage in the horizontal direction and the vertical direction of the beam may be changed.

With reference to the first aspect or any one of the foregoing possible implementations of the first aspect, in a sixth possible implementation of the first aspect, the control unit is further configured to control the reconfigurable network unit to adjust a phase shift increment in the antenna subarray group connected to the at least one of the K radio frequency channels. In other words, in this embodiment of this application, the radio frequency channel is changed to connect to different antenna subarrays, to change the phase shift increment in the antenna subarray group connected to the radio frequency channel. The beam generated by the antenna subarray group connected to the radio frequency channel may have different directions when the phase shift increment is different, so that a direction of the beam may be changed.

According to a second aspect, this application provides a feeding network reconfiguration method. The method includes: dividing L antenna subarrays in an antenna array into M antenna subarray groups, and separately connecting the M antenna subarray groups to K radio frequency channels, where one polarization direction of one antenna subarray group is connected to one radio frequency channel, L is a positive integer greater than 1, M is a positive integer, and K is an integer multiple of M; and any one of the K radio frequency channels is configured to perform signal processing on a signal received by a connected antenna subarray group and/or a to-be-transmitted signal; and adjusting a mapping relationship between an antenna subarray group connected to at least one of the K radio frequency channels and the antenna subarrays.

According to this embodiment of this application, a mapping relationship between an antenna subarray group connected to each radio frequency channel and the antenna subarrays is adjusted, to change a quantity of radiating elements in a horizontal direction and/or a vertical direction in the antenna subarray group connected to each radio frequency channel, or may change distribution status of the radio frequency channels in the horizontal direction and/or the vertical direction, to change coverage of a beam generated by the antenna subarray group connected to the at least one radio frequency channel. A larger quantity of radiating elements in the horizontal direction in an antenna subarray group indicates a narrower beam width on a horizontal plane of a beam generated by the antenna subarray group, and a larger quantity of radiating elements in the vertical direction in the antenna subarray group indicates a narrower beam width of the beam generated by the antenna subarray group. Therefore, a width of a beam generated by the antenna subarray group connected to each radio frequency channel and a beam direction of a beam generated by an antenna subarray group connected to each of the K radio frequency channels may be adjusted. Beam coverage of the antenna system may be dynamically adjusted by adjusting the beam width and the beam direction.

With reference to the second aspect, in a first possible implementation of the second aspect, the adjusting a mapping relationship between an antenna subarray group connected to at least one of the K radio frequency channels and the antenna subarrays includes: adjusting a quantity X of antenna subarray groups in a horizontal direction connected to the K radio frequency channels, where beams generated in a same polarization direction of the X antenna subarray groups in the horizontal direction include E directions in the horizontal direction, both X and E are positive integers, and 1≤E≤X≤M. In other words, in this embodiment of this application, the antenna system may adjust the quantity of the antenna subarray groups in the horizontal direction connected to the K radio frequency channels. When each polarization of the antenna array corresponds, in the horizontal direction, to antenna subarray groups separately connected to a plurality of radio frequency channels, each polarization of the antenna system may perform multi-direction beam covering in the horizontal direction. When each polarization of the antenna array corresponds, in the horizontal direction, to an antenna subarray group connected to a single radio frequency channel, the antenna system may perform single-direction beam covering in the horizontal direction. Therefore, horizontal coverage of a beam of the antenna system may be changed by adjusting the quantity of the antenna subarray groups in the horizontal direction connected to the K radio frequency channels.

With reference to the second aspect or the first possible implementations of the second aspect, in a second possible implementation of the second aspect, the adjusting a mapping relationship between an antenna subarray group connected to at least one of the K radio frequency channels and the antenna subarrays includes: adjusting a quantity Y of antenna subarray groups in a vertical direction connected to the K radio frequency channels, where beams generated in a same polarization direction of the Y antenna subarray groups in the vertical direction include F directions in the vertical direction, both Y and F are positive integers, and 1≤F≤Y≤M. In other words, in this embodiment of this application, the quantity of the antenna subarray groups in the vertical direction connected to the K radio frequency channels is adjusted. When each polarization of the antenna array corresponds, in the vertical direction, to antenna subarray groups separately connected to a plurality of radio frequency channels, each polarization of the antenna system may perform multi-direction beam covering in the vertical direction. When each polarization of the antenna array corresponds, in the vertical direction, to an antenna subarray group connected to a single radio frequency channel, the antenna system may perform single-direction beam covering in the vertical direction. Therefore, vertical coverage of the beam of the antenna system may be changed by adjusting the quantity of the antenna subarray groups in the vertical direction connected to the K radio frequency channels.

With reference to the second aspect or any one of the foregoing possible implementations of the second aspect, in a third possible implementation of the second aspect, the adjusting a mapping relationship between an antenna subarray group connected to at least one of the K radio frequency channels and the antenna subarrays includes: adjusting a quantity of antenna subarrays in the horizontal direction included in the antenna subarray group connected to the at least one of the K radio frequency channels, where beams generated by antenna subarray groups that include different quantities of antenna subarrays in the horizontal direction have different widths in the horizontal direction. In other words, in this embodiment of this application, the quantity of the antenna subarrays in the horizontal direction included in the antenna subarray group connected to the radio frequency channel is changed. Because a larger quantity of antenna subarrays in the horizontal direction in an antenna subarray group indicates a narrower horizontal width of a beam generated by the antenna subarray group, coverage in the horizontal direction of the beam may be changed.

With reference to the second aspect or any one of the foregoing possible implementations of the second aspect, in a fourth possible implementation of the second aspect, the adjusting a mapping relationship between an antenna subarray group connected to at least one of the K radio frequency channels and the antenna subarrays includes: adjusting a quantity of antenna subarrays in the vertical direction included in the antenna subarray group connected to the at least one of the K radio frequency channels, where beams generated by antenna subarray groups that include different quantities of antenna subarrays in the vertical direction have different widths in the vertical direction. In other words, in this embodiment of this application, the quantity of the antenna subarrays in the vertical direction included in the antenna subarray group connected to the radio frequency channel is adjusted. Because a larger quantity of antenna subarrays in the vertical direction in an antenna subarray group indicates a narrower vertical width of a beam generated by the antenna subarray group, coverage in the vertical direction of the beam may be changed.

With reference to the second aspect or any one of the foregoing possible implementations of the second aspect, in a fifth possible implementation of the second aspect, the method further includes: adjusting a spacing between antenna subarrays included in the antenna subarray group connected to the at least one of the K radio frequency channels, to change a width of the beam generated by the antenna subarray group connected to the at least one radio frequency channel. In other words, in this embodiment of this application, a horizontal spacing between the antenna subarrays in the antenna subarray group connected to the radio frequency channel is changed. Because a larger horizontal spacing between antenna subarrays connected to one radio frequency channel indicates a narrower horizontal width of a radio frequency channel beam, and a larger vertical spacing between antenna subarrays connected to one radio frequency channel indicates a narrower vertical width of a radio frequency channel beam, coverage in the horizontal direction and the vertical direction of the beam may be changed.

With reference to the second aspect or any one of the foregoing possible implementations of the second aspect, in a sixth possible implementation of the second aspect, the method further includes: adjusting a phase shift increment in the antenna subarray group connected to the at least one of the K radio frequency channels. In other words, in this embodiment of this application, the radio frequency channel is changed to connect to different antenna subarrays, to change the phase shift increment in the antenna subarray group connected to the radio frequency channel. The beam generated by the antenna subarray group connected to the radio frequency channel may have different directions when the phase shift increment is different, so that a direction of the beam may be changed.

According to a third aspect, this application provides an antenna system. The antenna system includes a processor and a memory, the memory is configured to store program code, and when the program code is executed by the processor, the antenna system implements a function of the antenna system according to the first aspect.

According to a fourth aspect, this application provides a network device. The network device includes a processor, and the processor is configured to support the network device in implementing a function of the antenna system according to the first aspect. The network device may further include a memory, where the memory is configured to couple with the processor, and stores a program instruction and data that are necessary for the network device. The network device may further include a communications interface. The communications interface is used by the network device to communicate with another device or a communications network.

According to a fifth aspect, this application provides a processing apparatus. The processing apparatus includes a processor, and the processor is configured to support the processing apparatus in implementing a function of the control unit in the antenna system according to the first aspect.

According to a sixth aspect, this application provides a computer storage medium, configured to store a computer software instruction used by a processor in the antenna system according to the second aspect. The computer software instruction includes a program designed for performing the foregoing aspects.

According to a seventh aspect, this application provides a computer program. The computer program includes an instruction, and when the computer program is executed by a computer, the computer is enabled to perform a function performed by the control unit in the antenna system in the first aspect.

DESCRIPTION OF EMBODIMENTS

The following describes embodiments of the present invention with reference to the accompanying drawings in the embodiments of the present invention.

In the specification, claims, and accompanying drawings of this application, the terms "first", "second", "third", "fourth" and so on are intended to distinguish between different objects but do not indicate a particular order. In addition, the terms "including", "having", or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

Figure 1:
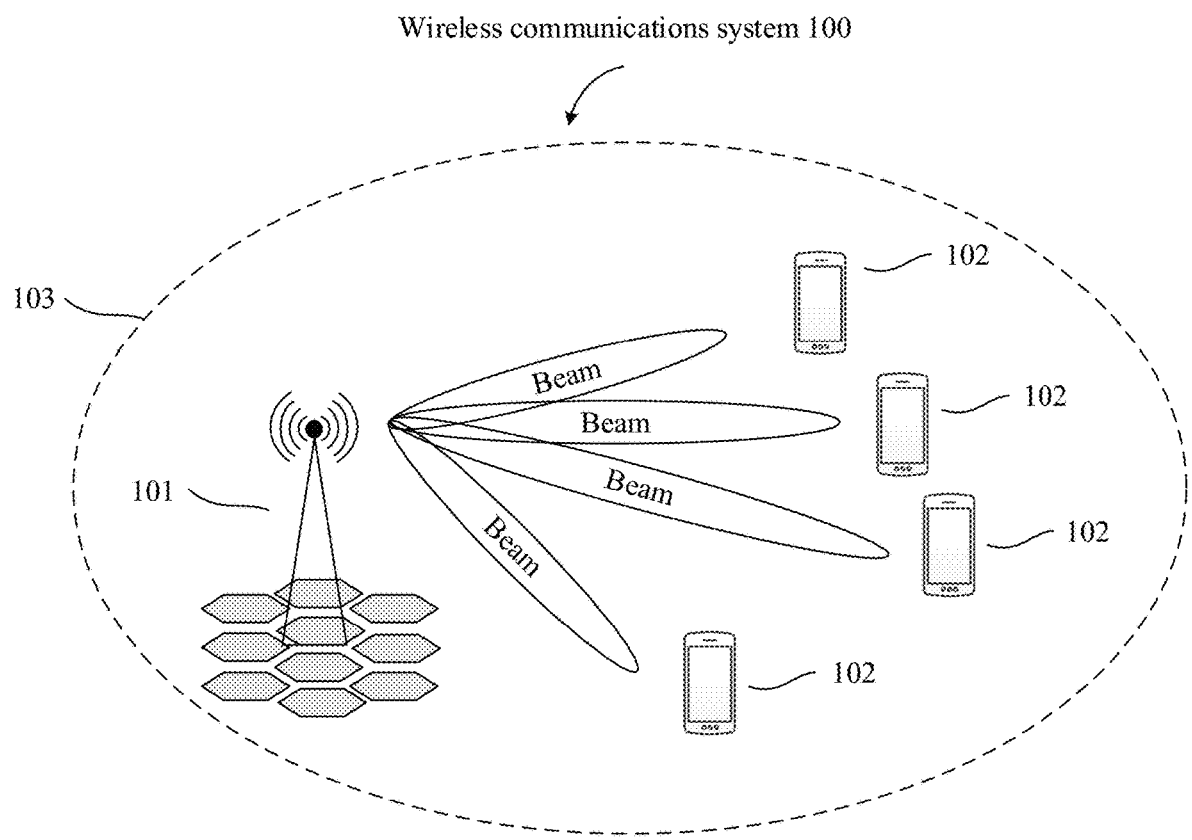
FIG. 1 is an architectural diagram of a wireless communications system according to this application.

FIG. 1 is an architectural diagram of a communications system according to an embodiment of the present invention. The wireless communications system 100 may include one or more network devices 101 and one or more terminal devices 102. The network device 101 may be used as a transmit end of a beam, or may be used as a receive end. Similarly, the terminal device 102 may be used as a receive end or may be used as a transmit end. This is not specifically limited in this application.

The network device 101 may be an antenna system in this application, or may be configured as a device including an antenna system in this application, and generate beams of different directions by using the antenna system, to cover an entire cell 103. For example, in a downlink communication process, the network device 101 may sequentially generate beams of different directions to transmit radio signals, to communicate with terminal devices 102 at different locations. Optionally, the network device 101 may be a base station, and the base station may be a base transceiver station (BTS) in a time division synchronous code division multiple access (TD-SCDMA) system, or may be an evolved NodeB (eNB) in an LTE system, or a base station in a 5G system or a new radio (NR) system. In addition, the base station may alternatively be an access point (AP), a transmission reception point (TRP), a central unit (CU), or another network entity, and may include some or all of functions of the foregoing network entities.

The terminal devices 102 may be distributed throughout the wireless communications system 100, and may be stationary or mobile. In some embodiments of this application, the terminal device 102 may be a mobile device, a mobile station (MS), a mobile unit (MU), an M2M terminal, an antenna unit, a remote unit, a terminal agent, a mobile client, or the like. In a future communications system, the terminal device 102 may alternatively be an antenna system in this application, or may be configured as a terminal device including an antenna system in this application. For example, the terminal device 102 generates beams of different directions by using the antenna system, and performs uplink communication with the network device 101, or performs M2M communication with another terminal device 102, or the like. In other words, the wireless communications system 100, both the network device 101 and the terminal device 102 may perform beam alignment and multi-beam communication by using the antenna system in this application.

The wireless communications system 100 shown in FIG. 1 may work on a high-frequency band, and is not limited to a long term evolution (LTE) system, but may alternatively be a future evolved fifth generation (5G) mobile communications system, a new radio (NR) system, a machine to machine communications (M2M) system, or the like.

It may be understood that, based on the architecture of the wireless communications system in FIG. 1, the antenna system in this application includes an antenna array. Because directivity of a single antenna is limited, for application in various scenarios, two or more single antennas operating on a same frequency are fed and spatially arranged according to a specific requirement to form an antenna array. Antenna radiating units that constitute the antenna array are referred to as array elements. The antenna array includes a phased array antenna (PAA). The phased array antenna is a directional antenna array formed by arranging radiating elements. A phase relationship between the radiating elements is controllable. The antenna array controls a signal phase of each radiating element by using a phase shifter, to change a direction in which signals of the entire antenna array are superimposed and strengthened in space, so that electronic scanning of a beam is implemented. In other words, the phased array antenna is an antenna that changes a pattern shape of a beam by controlling a feeding phase of the radiating element in the antenna array. A direction of a maximum value of an antenna pattern may be changed by controlling the phase, to achieve an objective of beam scanning.

It may be understood that the architecture of the wireless communications system in FIG. 1 is merely an example implementation in the embodiments of the present invention, and an architecture of a communications system in the embodiments of the present invention includes but is not limited to the foregoing architecture of the communications system.

Based on the foregoing wireless communications system and with reference to the embodiments of the antenna system according to this application, the following specifically analyzes and resolves the technical problem proposed in this application.

Figure 2:
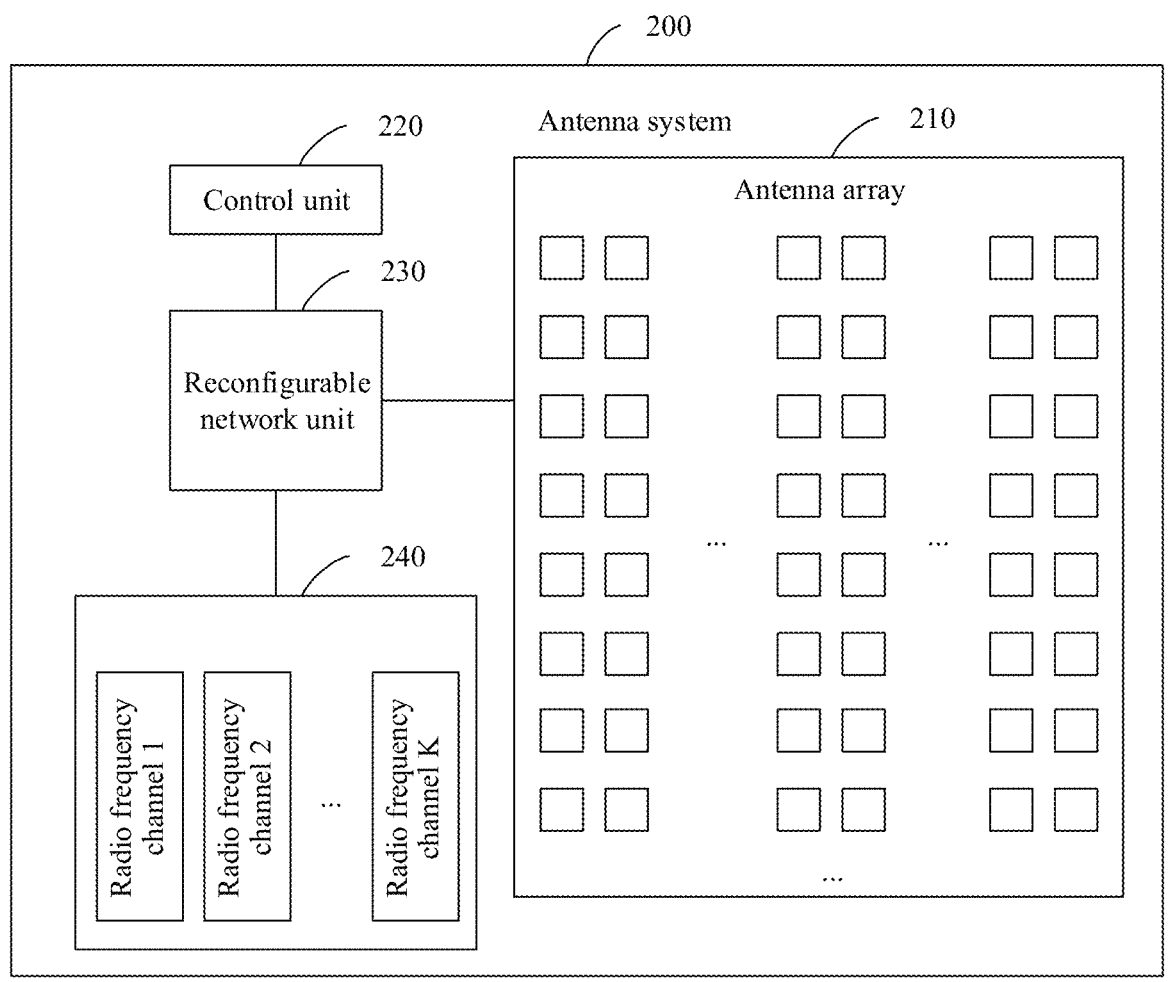
FIG. 2 is a schematic structural diagram of an antenna system according to this application.

FIG. 2 is a structural diagram of an antenna system according to an embodiment of the present invention. As shown in FIG. 2, an antenna system 200 includes an antenna array 210, a control unit 220, a reconfigurable network unit 230, and K radio frequency channels 240. The antenna array 210, the control unit 220, the reconfigurable network unit 230, and the K radio frequency channels 240 are connected by using feeder cables or in another manner.

The antenna array 210 may include L antenna subarrays, where L is a positive integer greater than 1. The antenna array in this application may alternatively be a triangular array, a hexagon array, a rhombus array, a circular array, or the like. Therefore, at least radiating elements of A rows by B columns included in the antenna array in this application may correspond to some of the foregoing arrays of various modes. Optionally, in the foregoing arrays of various modes, a location relationship between a radiating element in A rows and a radiating element in B columns in this application is relatively vertical. Any one of the L antenna subarrays includes a radiating element.

Figure 3:
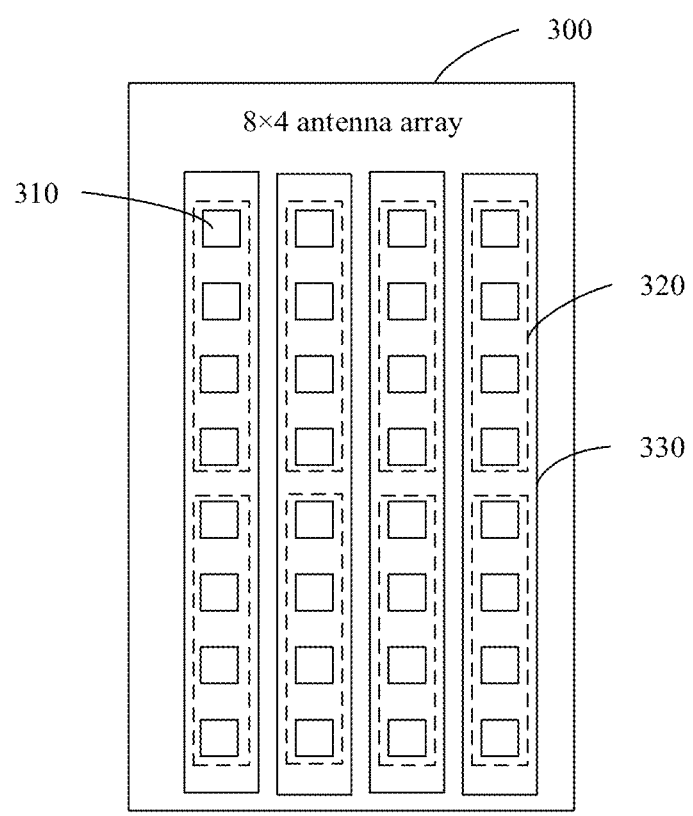
FIG. 3 is a schematic structural diagram of an antenna array of radiating elements of eight rows by four columns according to this application.

For example, FIG. 3 is a schematic structural diagram of an antenna array with radiating elements of eight rows by four columns according to an embodiment of the present invention. In FIG. 3, the antenna array of eight rows by four columns may include eight antenna subarrays. As shown in FIG. 3, radiating elements 310 in each dashed line frame form one antenna subarray 320. The eight antenna subarrays 320 may be divided into four antenna subarray groups 330. As shown in FIG. 3, adjacent antenna subarrays 320 in each solid line frame may form one antenna subarray group 330. Specifically, the radiating elements 310 included in the antenna subarrays 320 do not overlap, and the antenna subarrays 320 included in the antenna subarray groups 330 do not overlap either. The example is merely used to explain this application and shall not constitute a limitation.

The reconfigurable network unit 230 may be configured to: divide the L antenna subarrays into M antenna subarray groups, and separately connect the M antenna subarray groups to the K radio frequency channels. One polarization direction of one antenna subarray group is connected to one radio frequency channel, M is a positive integer, and K is an integer multiple of M.

In specific implementation, the reconfigurable network unit 230 may include at least two working states. In different working states, quantities of antenna subarrays, in a horizontal direction or a vertical direction, separately included in the M antenna subarray groups are different. For example, in a network state 1, an antenna subarray group 1 includes an antenna subarray 1 and an antenna subarray 2, and an antenna subarray group 2 includes an antenna subarray 3 and an antenna subarray 4. In a network state 2, the antenna subarray group 1 includes the antenna subarray 1 and the antenna subarray 3, and the antenna subarray group 2 includes the antenna subarray 2 and the antenna subarray 4. The example is merely used to explain this application and shall not constitute a limitation.

In specific implementation, polarization types of a radiating element in the antenna array include single polarization and dual polarization. When the radiating element in the antenna array is single-polarized, one antenna subarray group of the radiating element in the antenna array may have one feeding port, and the feeding port may be configured to simultaneously feed elements on each radiating element in the antenna subarray group. In this case, K=M. When the radiating element in the antenna array is dual-polarized, one antenna subarray group of the radiating element in the antenna array may have two feeding ports, and each feeding port may feed elements in a same polarization direction on each radiating element in the antenna subarray group. Polarization directions of dual polarization may be +45° and −45°. In this case, K=2M. Therefore, in this embodiment of the present invention, when the radiating element is multi-polarized, the antenna system can change, in each polarization direction, a quantity of antenna subarray groups in a horizontal direction and/or a vertical direction connected to the K radio frequency channels. In this way, coverage of a beam can be adjusted in each polarization direction of the antenna.

Any one of the K radio frequency channels 240 is configured to perform signal processing on a signal received by a connected antenna subarray group and/or a to-be-transmitted signal.

In specific implementation, each radio frequency channel may be connected to one antenna subarray group, and the antenna subarray group may include a plurality of radiating elements. In other words, one radio frequency channel may include a plurality of radiating elements. Indicators of a single radio frequency channel may include a radiation gain, a horizontal or vertical beam width (horizontal and vertical half-power angles), a beam direction, and the like. There is a specific amplitude and phase relationship between a plurality of radiating elements connected to one radio frequency channel. Under a function of a same feed, a beam pattern is formed by beamforming in an operating frequency band of the radio frequency channel. The radio frequency channel may include a receive channel and a transmit channel. The receive channel is configured to demodulate a radio frequency signal from an antenna or another device to an orthogonal baseband signal, and the transmit channel modulates the orthogonal baseband signal to the radio frequency signal. A circuit of the receive channel includes a front-end filter, a programmable attenuator, a limiter, a low-noise preamplifier, a quadrature demodulator, differential filter and amplifier, and a wideband local oscillator. A circuit of the transmit channel includes an orthogonal demodulator, a programmable attenuator, a driver amplifier, and a wideband local oscillator.

The control unit 220 may be configured to control the reconfigurable network unit 230 to adjust a mapping relationship between an antenna subarray group connected to at least one of the K radio frequency channels and the antenna subarrays.

In specific implementation, the reconfigurable network unit 230 may include at least two network states. In each network state, quantities of antenna subarrays, in a horizontal direction and/or a vertical direction, in the antenna subarray groups connected to the K radio frequency channels are different.

For example, the reconfigurable network unit may include a network state 1 and a network state 2. The antenna array may be divided into an antenna subarray 1, an antenna subarray 2, an antenna subarray 3, and an antenna subarray 4. The antenna subarray 1 is horizontally adjacent to the antenna subarray 2, and is vertically adjacent to the antenna subarray 3. The antenna subarray 4 is vertically adjacent to the antenna subarray 2, and is horizontally adjacent to the antenna subarray 3. In the network state 1, the antenna subarray 1 and the antenna subarray 2 may form an antenna subarray group A to be connected to a radio frequency channel 1, and the antenna subarray 3 and the antenna subarray 4 may form an antenna subarray group B to be connected to a radio frequency channel 2. Therefore, the radio frequency channel 1 and the radio frequency channel 2 are distributed in the vertical direction, so that the antenna system may form beams of two directions on a vertical plane, and directions of the two beams are consistent in the horizontal direction. Therefore, beam scanning in the vertical direction can be implemented, and wide coverage in the vertical direction can be implemented. In the network state 2, the antenna subarray 1 and the antenna subarray 3 may form an antenna subarray group A to be connected to the radio frequency channel 1, and the antenna subarray 2 and the antenna subarray 4 may form an antenna subarray group B to be connected to the radio frequency channel 2. Therefore, the radio frequency channel 1 and the radio frequency channel 2 are distributed in the horizontal direction, so that the antenna system may form beams of two directions on a horizontal plane, and directions of the two beams are consistent on the vertical plane. Therefore, beam scanning in the horizontal direction can be implemented, and wide coverage in the horizontal direction can be implemented. The example is merely used to explain this application and shall not constitute a limitation.

Based on a hardware structure of an antenna array in the prior art, this embodiment of the present invention adds the reconfigurable network unit between the radio frequency channel and the antenna array. The control unit in the antenna system controls the reconfigurable network unit to change the network state and adjust a mapping relationship between an antenna subarray group connected to each radio frequency channel and the antenna subarrays, to change a quantity of radiating elements in the horizontal direction and/or the vertical direction in the antenna subarray group connected to each radio frequency channel, or may change distribution status of the radio frequency channels in the horizontal direction and/or the vertical direction, to change coverage of a beam generated by the antenna subarray group connected to the at least one of the K radio frequency channels. A larger quantity of radiating elements in the horizontal direction in an antenna subarray group indicates a narrower beam width on a horizontal plane of a beam generated by the antenna subarray group, and a larger quantity of radiating elements in the vertical direction in the antenna subarray group indicates a narrower beam width of the beam generated by the antenna subarray group. Therefore, a width of a beam generated by the antenna subarray group connected to each radio frequency channel and a beam direction of a beam generated by an antenna subarray group connected to each of the K radio frequency channels may be adjusted. Beam coverage of the antenna system may be dynamically adjusted by adjusting the beam width and the beam direction.

In a possible implementation, the control unit 220 may be configured to control the reconfigurable network unit 230 to adjust a quantity X of antenna subarray groups in the horizontal direction connected to the K radio frequency channels 240, where beams generated in a same polarization direction of the X antenna subarray groups in the horizontal direction include E directions in the horizontal direction, both X and E are positive integers, and 1≤E≤X<M. In other words, in this embodiment of this application, the control unit may control the reconfigurable network unit to adjust the quantity of the antenna subarray groups in the horizontal direction connected to the K radio frequency channels. When each polarization of the antenna array corresponds, in the horizontal direction, to antenna subarray groups separately connected to a plurality of radio frequency channels, each polarization of the antenna system may perform multi-direction beam covering in the horizontal direction. When each polarization of the antenna array corresponds, in the horizontal direction, to an antenna subarray group connected to a single radio frequency channel, the antenna system may perform single-direction beam covering in the horizontal direction. Therefore, horizontal coverage of a beam of the antenna system may be changed by adjusting the quantity of the antenna subarray groups in the horizontal direction connected to the K radio frequency channels.

In a possible implementation, the control unit 220 may be configured to control the reconfigurable network unit 230 to adjust a quantity Y of antenna subarray groups in the vertical direction connected to the K radio frequency channels 240, where beams generated in a same polarization direction of the Y antenna subarray groups in the vertical direction include F directions in the vertical direction, both Y and F are positive integers, and 1≤F≤Y≤M. In other words, in this embodiment of this application, the control unit may control the reconfigurable network unit to adjust the quantity of the antenna subarray groups in the vertical direction connected to the K radio frequency channels. When each polarization of the antenna array corresponds, in the vertical direction, to antenna subarray groups separately connected to a plurality of radio frequency channels, each polarization of the antenna system may perform multi-direction beam covering in the vertical direction. When each polarization of the antenna array corresponds, in the vertical direction, to an antenna subarray group connected to a single radio frequency channel, the antenna system may perform single-direction beam covering in the vertical direction. Therefore, vertical coverage of the beam of the antenna system may be changed by adjusting the quantity of the antenna subarray groups in the vertical direction connected to the K radio frequency channels.

In a possible implementation, the control unit 220 may be configured to control the reconfigurable network unit 230 to adjust a quantity of antenna subarrays in the horizontal direction included in the antenna subarray group connected to the at least one of the K radio frequency channels 240, where beams generated by antenna subarray groups that include different quantities of antenna subarrays in the horizontal direction have different widths in the horizontal direction. In other words, in this embodiment of this application, the quantity of the antenna subarrays in the horizontal direction included in the antenna subarray group connected to the radio frequency channel is changed. Because a larger quantity of antenna subarrays in the horizontal direction in an antenna subarray group indicates a narrower horizontal width of a beam generated by the antenna subarray group, coverage in the horizontal direction of the beam may be changed.

In a possible implementation, the control unit 220 may be configured to control the reconfigurable network unit 230 to adjust a quantity of antenna subarrays in the vertical direction included in the antenna subarray group connected to the at least one of the K radio frequency channels 240, where beams generated by antenna subarray groups that include different quantities of antenna subarrays in the vertical direction have different widths in the vertical direction. In other words, in this embodiment of this application, the quantity of the antenna subarrays in the vertical direction included in the antenna subarray group connected to the radio frequency channel is adjusted. Because a larger quantity of antenna subarrays in the vertical direction in an antenna subarray group indicates a narrower vertical width of a beam generated by the antenna subarray group, coverage in the vertical direction of the beam may be changed.

In a possible implementation, the control unit 220 may be further configured to control the reconfigurable network unit 230 to adjust a spacing between antenna subarrays in the antenna subarray group connected to the at least one of the K radio frequency channels 240, to change a width of the beam generated by the antenna subarray group connected to the at least one radio frequency channel. In other words, in this embodiment of this application, a horizontal distance between the antenna subarrays in the antenna subarray group connected to the radio frequency channel is changed. Because a larger horizontal space distance between antenna subarrays connected to one radio frequency channel indicates a narrower horizontal width of a radio frequency channel beam, and a larger vertical space distance between antenna subarrays connected to one radio frequency channel indicates a narrower vertical width of a radio frequency channel beam, coverage in the horizontal direction and the vertical direction of the beam may be changed.

In a possible implementation, the control unit 220 may be further configured to control the reconfigurable network unit 230 to adjust a phase shift increment in the antenna subarray group connected to the at least one of the K radio frequency channels 240. In other words, in this embodiment of this application, the radio frequency channel is changed to connect to different antenna subarrays, to change the phase shift increment in the antenna subarray group connected to the radio frequency channel. The beam generated by the antenna subarray group connected to the radio frequency channel may have different directions when the phase shift increment is different, so that a direction of the beam may be changed.

With reference to the antenna system shown in FIG. 2, how the antenna system in this application controls the reconfigurable network unit to adjust the mapping relationship between the antenna subarray group connected to the at least one of the K radio frequency channels and the antenna subarrays, to change coverage of the beam generated by the antenna subarray group connected to the at least one radio frequency channel is described as an example in the following.

Figure 4:
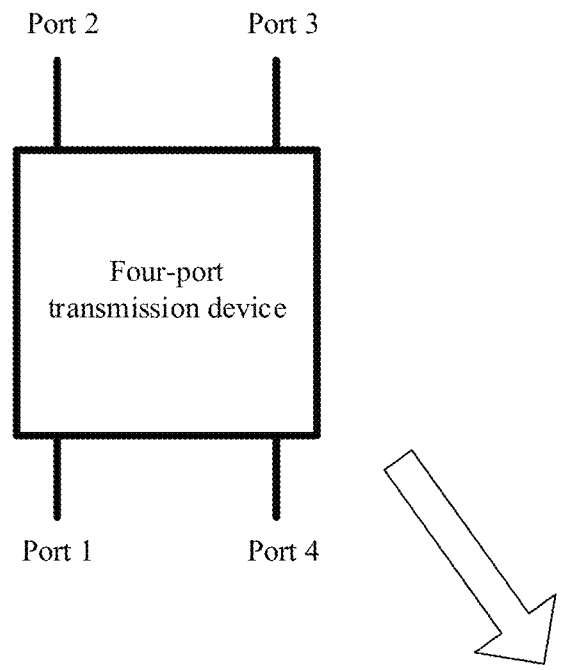
FIG. 4 is a schematic functional structural diagram of a four-port transmission device according to this application.
Figure 4:
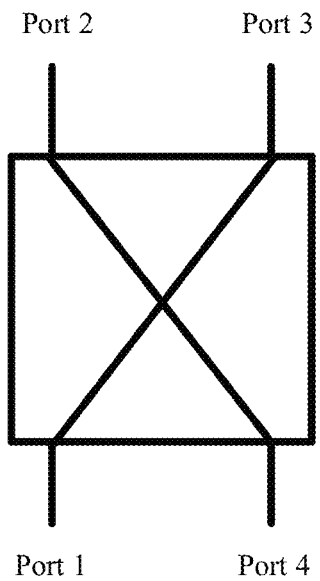
Figure 4:
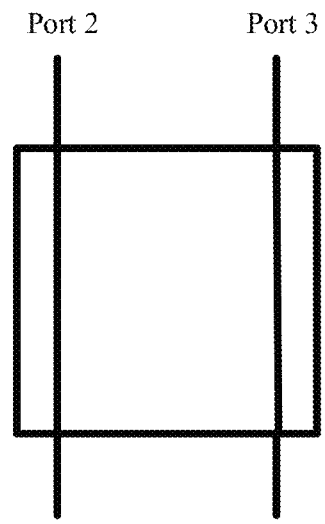

First, a four-port transmission device is described. FIG. 4 shows a four-port transmission device according to an embodiment of the present invention. The four-port transmission device may include four ports: a port 1, a port 2, a port 3, and a port 4. The transmission device may have two working states. In a working state 1, the four-port transmission device may implement radio frequency energy transmission of the port 1 and the port 3, and radio frequency energy transmission of the port 4 and the port 2, to implement effects of cross transmission. In a working state 2, the four-port transmission device may implement radio frequency energy transmission of the port 1 and the port 2, and radio frequency energy transmission of the port 4 and the port 3, to implement effects of parallel transmission. The reconfigurable network unit in FIG. 2 may include a plurality of the four-port transmission devices.

The following specifically describes, by using Implementation 1 to Implementation 3, how to use the reconfigurable network unit including the plurality of four-port transmission devices shown in FIG. 4 to control the reconfigurable network unit to adjust a spatial arrangement of the foregoing antenna subarrays in the antenna subarray group connected to the at least one of the K radio frequency channels, to change coverage of a beam generated by the antenna subarray group connected to the at least one radio frequency channel. The following embodiments include three beam coverage modes: a horizontal coverage mode, a vertical coverage mode, and a horizontal+vertical coverage mode. In the horizontal coverage mode, an antenna array is mapped to a plurality of radio frequency channels in a horizontal direction, and is mapped to a fixed radio frequency channel in a vertical direction. In the vertical coverage mode, the antenna array is mapped to a plurality of radio frequency channels in the vertical direction. In the horizontal+vertical coverage mode, the antenna array is mapped to a plurality of radio frequency channels in the horizontal direction and the vertical direction.

It should be noted that the following Implementation 1 to Implementation 3 are described by using a dual-polarized antenna array of 8×4 radiating elements and eight radio frequency channels as an example. Four radio frequency channels are mapped to an antenna array in each polarization direction, and TR is used to represent one radio frequency channel. To be specific, four radio frequency channels TR1, TR2, TR3, and TR4 are mapped to an antenna array in a first polarization direction, and four radio frequency channels TR5, TR6, TR7, and TR8 are mapped to an antenna array in a second polarization direction.

Figure 6A:
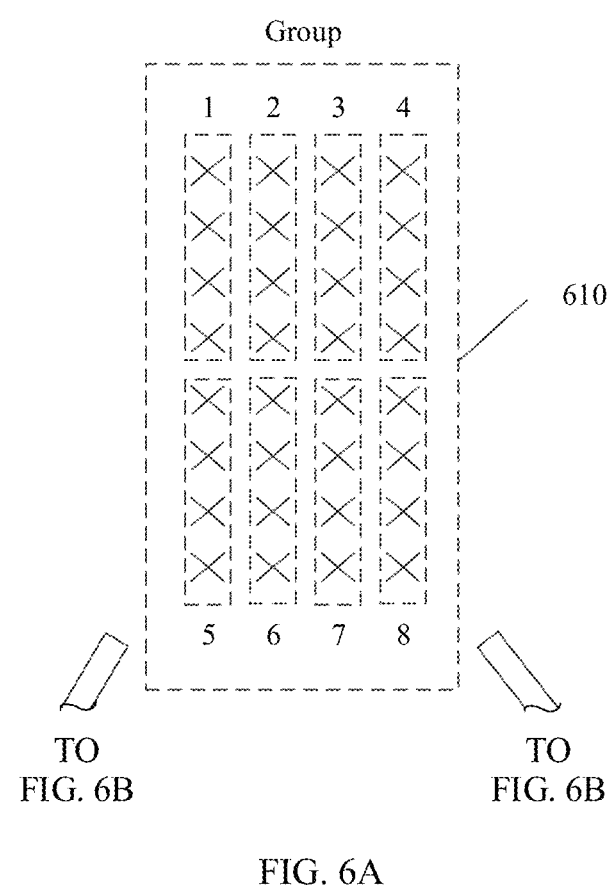
FIG. 6A to FIG. 6C are a schematic diagram of beam coverage mode switching according to this application.
Figure 6B:
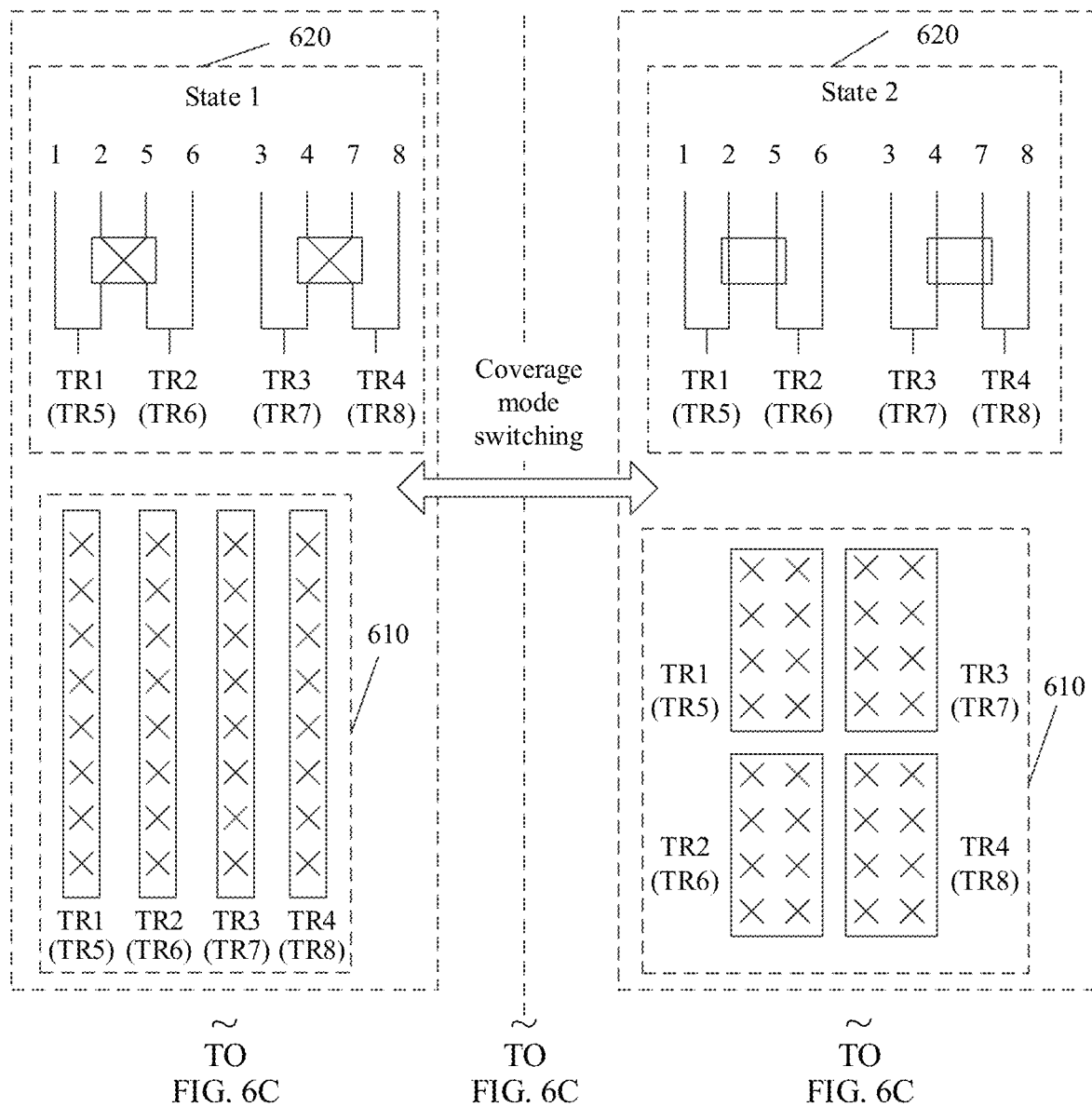
Figure 6C:
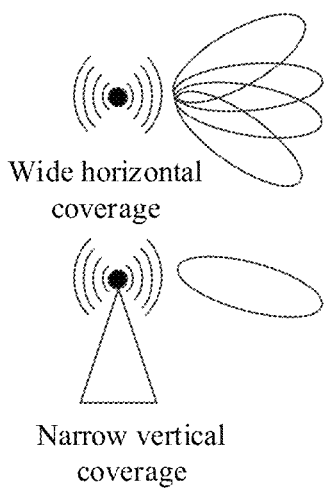
Figure 6C:
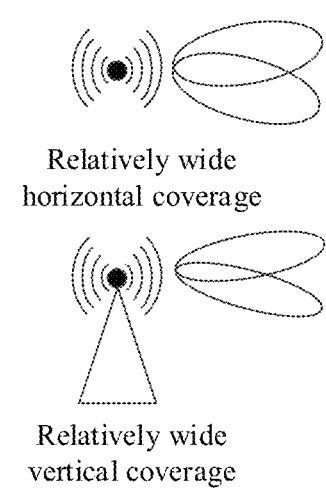

Implementation 1: Switching Between the Horizontal Coverage Mode and the Horizontal+Vertical Coverage Mode FIG. 6A to FIG. 6C are a schematic diagram of switching between the horizontal coverage mode and the horizontal+vertical coverage mode. The following four steps may be included to implement coverage mode switching.

Step 1: Group Antenna Arrays, and Divide the Antenna Arrays into a Plurality of Antenna Subarrays.

Specifically, as shown in FIG. 6A and FIG. 6B, an antenna array 610 may be divided into eight antenna subarrays, each antenna subarray may include radiating elements of four rows by one column, and the radiating element has two dual polarizations. The eight antenna subarrays are arranged in two rows and four columns on an antenna array plane.

Step 2: Connect the Plurality of Antenna Subarrays and Radio Frequency Channels to a Reconfigurable Network Unit.

Specifically, as shown in FIG. 6B, each polarization of a reconfigurable network unit 620 may include two four-port transmission devices. In each polarization direction of the antenna array, feeding ports corresponding to the eight antenna subarrays are divided into four antenna subarray groups by using the two four-port transmission devices, and the feeding ports corresponding to the four antenna subarray groups are separately connected to four radio frequency channels. Two polarizations of the radiating element are separately connected to two radio frequency channels, where TR1, TR2, TR3, and TR4 are radio frequency channels in a first polarization direction, and TR5, TR6, TR7, and TR8 are radio frequency channels in a second polarization direction. The reconfigurable network unit 620 in FIG. 6B shows a status of connection, by using the two four-port transmission devices, between the radio frequency channels TR1, TR2, TR3, and TR4 in the first polarization direction of the antenna array 610 and the antenna subarrays in the antenna array 610. For a status of connection, by using the two four-port transmission devices, between the radio frequency channels TR5, TR6, TR7, and TR8 in the second polarization direction of the antenna array 610 and the antenna subarrays in the antenna array 610, correspondingly refer to the radio frequency channels TR1, TR2, TR3, and TR4 in the first polarization direction.

Step 3: Adjust a Mapping Relationship Between the Antenna Subarray Group and the Antenna Subarray.

Specifically, when all the four-port transmission devices in the reconfigurable network unit 620 are in a working state 1 (cross state), an antenna subarray 1 and an antenna subarray 5 form an antenna subarray group A to be connected to the radio frequency channel TR1; an antenna subarray 2 and an antenna subarray 6 form an antenna subarray group B to be connected to the radio frequency channel TR2; an antenna subarray 3 and an antenna subarray 7 form an antenna subarray group C to be connected to the radio frequency channel TR3; and an antenna subarray 4 and an antenna subarray 8 form an antenna subarray group D to be connected to the radio frequency channel TR4. In the working state 1 of the reconfigurable network unit 620, one antenna subarray group includes the radiating elements of eight rows by one column in the antenna array. Therefore, a mapping relationship of the radio frequency channel on the antenna array is four radio frequency channels in a horizontal direction and one radio frequency channel in a vertical direction.

When all the four-port transmission devices in the reconfigurable network unit 620 are in a working state 2 (parallel state), the antenna subarray 1 and the antenna subarray 2 form the antenna subarray group A to be connected to the radio frequency channel TR1; the antenna subarray 5 and the antenna subarray 6 form the antenna subarray group B to be connected to the radio frequency channel TR2; the antenna subarray 3 and the antenna subarray 4 form the antenna subarray group C to be connected to the radio frequency channel TR3; and the antenna subarray 7 and the antenna subarray 8 form the antenna subarray group D to be connected to the radio frequency channel TR4. In the working state 2 of the reconfigurable network unit 620, one antenna subarray group includes the radiating elements of four rows by two columns in the antenna array. Therefore, a mapping relationship of the radio frequency channel on the antenna array is two radio frequency channels in the horizontal direction and two radio frequency channels in the vertical direction.

Step 4: The Antenna Subarray Group Forms a Beam.

Because phase shift increments in an antenna subarray group connected to one radio frequency channel are consistent, beamforming may be implemented by using the radio frequency channel based on a signal received or sent by each radiating element in the antenna subarray group.

Therefore, a plurality of beams of different directions may be generated by adjusting the phase shift increments in the antenna subarray group connected to the radio frequency channel.

As shown in FIG. 6B, in the working state 1 of the reconfigurable network unit 620, the radio frequency channels TR1, TR2, TR3, and TR4 of the antenna array 610 may be distributed in the horizontal direction of the antenna array, each 8×1 radiating elements form one antenna subarray group (one radiating element in each row, and eight radiating elements in each column) to be connected to one radio frequency channel. Phase shift increments in different antenna subarray groups are different, so that a beam coverage effect 1 of an antenna system is that there are beams of four directions in the horizontal direction, and there are beams of only one direction in the vertical direction. In addition, in each antenna subarray group, a quantity of rows of radiating elements is greater than a quantity of columns of the radiating elements. Therefore, a horizontal width of each beam is greater than a vertical width. In other words, the beam coverage effect 1 of the antenna system is wide horizontal coverage and narrow vertical coverage.

As shown in FIG. 6B, in the working state 2 of the reconfigurable network unit 620, the radio frequency channels TR1, TR2, TR3, and TR4 of the antenna array 610 may be distributed in the horizontal direction and the vertical direction of the antenna array, each 4×2 radiating elements form one antenna subarray group (two radiating elements in each row, and four radiating elements in each column) to be connected to one radio frequency channel. Phase shift increments in different antenna subarray groups are different, so that a beam coverage effect 2 of the antenna system is that there are beams of two directions in the horizontal direction, and there are also beams of two directions in the vertical direction. In addition, in each antenna subarray group, a quantity of rows of radiating elements is greater than a quantity of columns of the radiating elements. Therefore, a horizontal width of each beam is greater than a vertical width. In other words, the beam coverage effect 2 of the antenna system is relatively wide horizontal multi-beam coverage and relatively wide vertical multi-beam coverage, and vertical coverage of each beam is wider than horizontal coverage.

A larger quantity of antenna subarrays in the vertical direction in an antenna subarray group connected to a radio frequency channel indicates a narrower horizontal width of a beam generated by the antenna subarray group connected to the radio frequency channel. A larger quantity of antenna subarrays in the horizontal direction in an antenna subarray group connected to a radio frequency channel indicates a narrower vertical width of a beam generated by the antenna subarray group connected to the radio frequency channel. A larger quantity of antenna subarray groups that are distributed in the horizontal direction and connected to the K radio frequency channels indicates more beams of different directions generated by the antenna system in the horizontal direction. A larger quantity of antenna subarray groups that are distributed in the vertical direction and connected to the K radio frequency channels indicates more beams of different directions generated by the antenna system in the vertical direction. Therefore, a comparison result between the beam coverage effect 1 and the beam coverage effect 2 shown in FIG. 6C may be specifically shown in the following Table 1:

TABLE 1

| Comparison type | Beam coverage effect 1 | Beam coverage effect 2 |
| --- | --- | --- |
| Quantity of beams of different directions in a horizontal direction | 4 | 2 |
| Beam coverage in the horizontal direction | The beam coverage effect 1 is greater than the beam coverage effect 2 | |
| Horizontal beam width | The beam coverage effect 1 is greater than the beam coverage effect 2 | |
| Quantity of beams of different directions in a vertical direction | 1 | 2 |
| Beam coverage in the vertical direction | The beam coverage effect 1 is smaller than the beam coverage effect 2 | |
| Vertical beam width | The beam coverage effect 1 is smaller than the beam coverage effect 2 | |

With reference to FIG. 6C and Table 1, the reconfigurable network unit 620 switches between the working state 1 and the working state 2, so that the antenna system adjusts the quantity of the antenna subarrays in the antenna subarray groups connected to the K radio frequency channels. Further, in the reconfigurable network unit 620, switching is implemented between the beam coverage effect 1 in the working state 1 and the beam coverage effect 2 in the working state 2. In the horizontal direction, the beam coverage effect 1 has beams of four different directions, the beam coverage effect 2 has beams of two different directions, horizontal coverage of the beam coverage effect 1 is greater than horizontal coverage of the beam coverage effect 2, and a horizontal beam width of the beam coverage effect 1 is greater than a horizontal beam width of the beam coverage effect 2. In the vertical direction, the beam coverage effect 1 has beams of one fixed direction, the beam coverage effect 2 may have beams of two different directions, vertical coverage of the beam coverage effect 1 is smaller than vertical coverage of the beam coverage effect 2, and a vertical beam width of the beam coverage effect 1 is smaller than a vertical beam width of the beam coverage effect 2.

In Implementation 1, the beam coverage of the antenna system may be adjusted by switching between horizontal multi-channel distribution and horizontal+vertical multi-channel distribution of the radio frequency channel on the antenna array, to implement switching between "wide horizontal coverage and narrow vertical coverage" and "relatively wide horizontal coverage and relatively wide vertical coverage" of the beam of the antenna system.

Figure 7A:
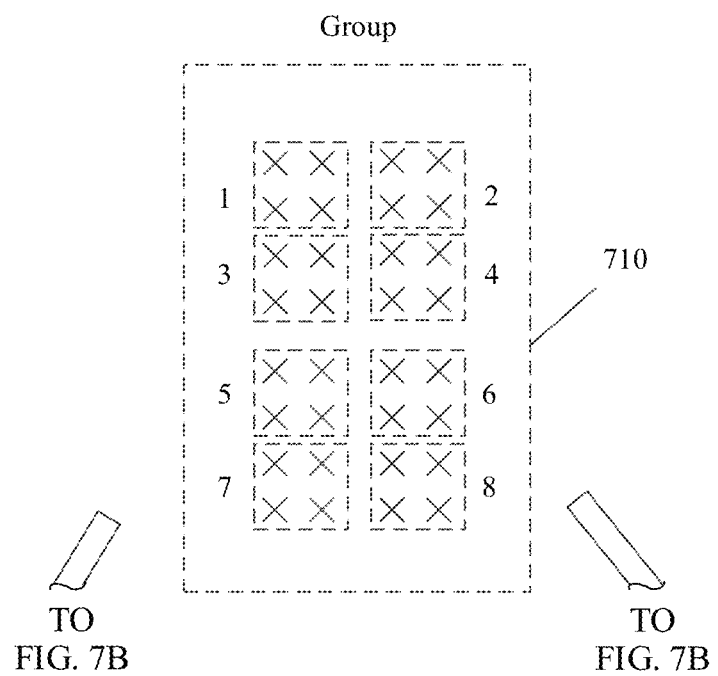
FIG. 7A to FIG. 7C are another schematic diagram of beam coverage mode switching according to this application.
Figure 7B:
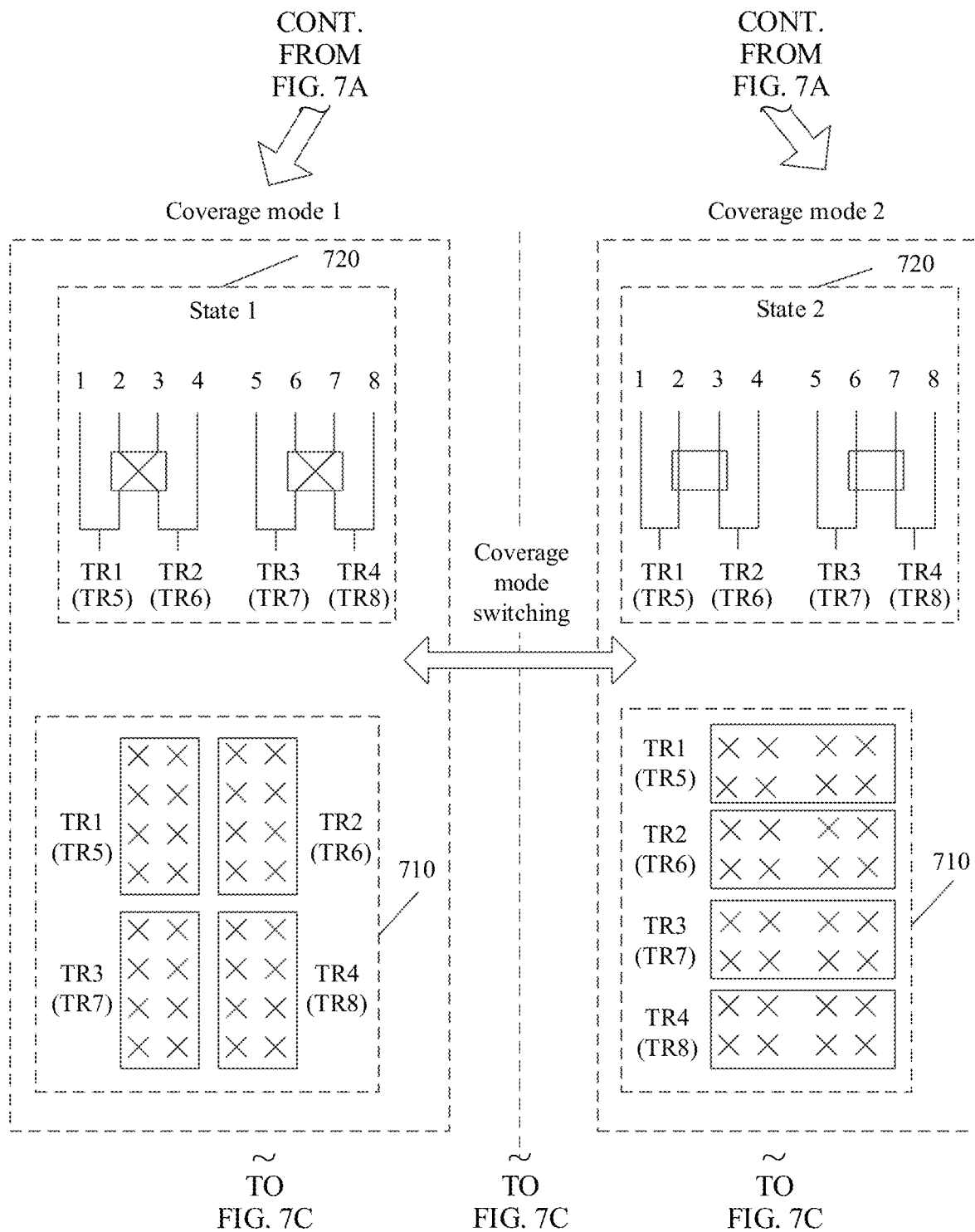
Figure 7C:
Figure 7C:
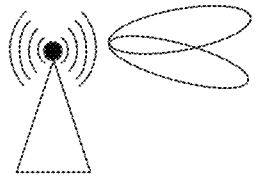
Figure 7C:
Figure 7C:
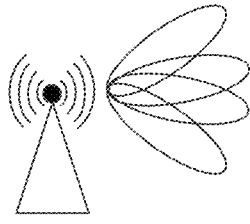

Implementation 2: Switching Between the Horizontal+Vertical Coverage Mode and the Vertical Coverage Mode FIG. 7A to FIG. 7C are a schematic diagram of switching between the horizontal+vertical coverage mode and the vertical coverage mode. The following four steps may be included to implement coverage mode switching.

Step 1: Group Antenna Arrays, and Divide the Antenna Arrays into a Plurality of Antenna Subarrays.

Specifically, as shown in FIG. 7A and FIG. 7B, an antenna array 710 may be divided into eight antenna subarrays, each antenna subarray may include radiating elements of two rows by two columns, and the radiating element has two dual polarizations. The eight antenna subarrays are arranged in four rows and two columns on an antenna array plane.

Step 2: Connect the Plurality of Antenna Subarrays and Radio Frequency Channels to a Reconfigurable Network Unit.

Specifically, as shown in FIG. 7B, each polarization of a reconfigurable network unit 720 may include two four-port transmission devices. In each polarization direction of the antenna array, feeding ports corresponding to the eight antenna subarrays are divided into four antenna subarray groups by using the two four-port transmission devices, and the feeding ports corresponding to the four antenna subarray groups are separately connected to four radio frequency channels. Two polarizations of the radiating element are separately connected to two radio frequency channels, where TR1, TR2, TR3, and TR4 are radio frequency channels in a first polarization direction, and TR5, TR6, TR7, and TR8 are radio frequency channels in a second polarization direction. The reconfigurable network unit 720 in FIG. 7B shows a status of connection, by using the two four-port transmission devices, between the radio frequency channels TR1, TR2, TR3, and TR4 in the first polarization direction of the antenna array 710 and the antenna subarrays in the antenna array 710. For a status of connection, by using the two four-port transmission devices, between the radio frequency channels TR5, TR6, TR7, and TR8 in the second polarization direction of the antenna array 710 and the antenna subarrays in the antenna array 710, correspondingly refer to the radio frequency channels TR1, TR2, TR3, and TR4 in the first polarization direction.

Step 3: Adjust a Mapping Relationship Between the Antenna Subarray Group and the Antenna Subarray.

Specifically, when all the four-port transmission devices in the reconfigurable network unit 720 are in a state 1 (cross state), an antenna subarray 1 and an antenna subarray 3 form an antenna subarray group A to be connected to the radio frequency channel TR1; an antenna subarray 2 and an antenna subarray 4 form an antenna subarray group B to be connected to the radio frequency channel TR2; an antenna subarray 5 and an antenna subarray 7 form an antenna subarray group C to be connected to the radio frequency channel TR3; and an antenna subarray 6 and an antenna subarray 8 form an antenna subarray group D to be connected to the radio frequency channel TR4. In the state 1, one antenna subarray group includes the radiating elements of four rows by two columns in the antenna array. Therefore, a mapping relationship of the radio frequency channel on the antenna array is two radio frequency channels in a horizontal direction and two radio frequency channels in a vertical direction.

When all the four-port transmission devices in the reconfigurable network unit 720 are in a state 2 (parallel state), the antenna subarray 1 and the antenna subarray 2 form the antenna subarray group A to be connected to the radio frequency channel TR1; the antenna subarray 3 and the antenna subarray 4 form the antenna subarray group B to be connected to the radio frequency channel TR2; the antenna subarray 5 and the antenna subarray 6 form the antenna subarray group C to be connected to the radio frequency channel TR3; and the antenna subarray 7 and the antenna subarray 8 form the antenna subarray group D to be connected to the radio frequency channel TR4. In the state 2, one antenna subarray group includes the radiating elements of two rows by four columns in the antenna array. Therefore, a mapping relationship of the radio frequency channel on the antenna array is one radio frequency channel in the horizontal direction and four radio frequency channels in the vertical direction.

Step 4: The Antenna Subarray Group Forms a Beam.

Because phase shift increments between radiating elements in an antenna subarray group connected to one radio frequency channel are consistent, beamforming may be implemented by using the radio frequency channel based on a signal received or sent by each radiating element in the antenna subarray group.

Therefore, beams of a plurality of directions may be generated by adjusting the phase shift increments in the antenna subarray group connected to the radio frequency channel.

As shown in FIG. 7B, in the working state 1 of the reconfigurable network unit 720, the radio frequency channels TR1, TR2, TR3, and TR4 of the antenna array 710 may be distributed in the horizontal direction and the vertical direction of the antenna array, each 4×2 radiating elements form one antenna subarray group (two radiating elements in each row, and four radiating elements in each column) to be connected to one radio frequency channel. Phase shift increments in different antenna subarray groups are different, so that a beam coverage effect 1 of an antenna system is that there are beams of two directions in the horizontal direction, and there are also beams of two directions in the vertical direction. In addition, in each antenna subarray group, a quantity of rows of radiating elements is greater than a quantity of columns of the radiating elements. Therefore, a horizontal width of each beam is greater than a vertical width. In other words, the beam coverage effect 1 of the antenna system is relatively wide horizontal multi-beam coverage and relatively wide vertical multi-beam coverage.

As shown in FIG. 7B, in the working state 2 of the reconfigurable network unit 720, the radio frequency channels TR1, TR2, TR3, and TR4 of the antenna array 710 may be distributed in the horizontal direction and the vertical direction of the antenna array, each 2×4 radiating elements form one antenna subarray group (four radiating elements in each row, and two radiating elements in each column) to be connected to one radio frequency channel. Phase shift increments in different antenna subarray groups are different, so that a beam coverage effect 2 of the antenna system is that there are beams of one direction in the horizontal direction, and there are beams of four directions in the vertical direction. In addition, in each antenna subarray group, a quantity of columns of radiating elements is greater than a quantity of rows of the radiating elements. Therefore, a vertical width of each beam is greater than a horizontal width. In other words, the beam coverage effect 2 of the antenna system is relatively wide horizontal single-beam coverage and wide vertical multi-beam coverage.

A larger quantity of antenna subarrays in the vertical direction in an antenna subarray group connected to a radio frequency channel indicates a narrower horizontal width of a beam generated by the antenna subarray group connected to the radio frequency channel. A larger quantity of antenna subarrays in the horizontal direction in an antenna subarray group connected to a radio frequency channel indicates a narrower vertical width of a beam generated by the antenna subarray group connected to the radio frequency channel. A larger quantity of antenna subarray groups that are distributed in the horizontal direction and connected to the K radio frequency channels indicates more beams of different directions generated by the antenna system in the horizontal direction. A larger quantity of antenna subarray groups that are distributed in the vertical direction and connected to the K radio frequency channels indicates more beams of different directions generated by the antenna system in the vertical direction. Therefore, a comparison result between the beam coverage effect 1 and the beam coverage effect 2 shown in FIG. 7C may be specifically shown in the following Table 2:

TABLE 2

| Comparison type | Beam coverage effect 1 | Beam coverage effect 2 |
|---|---|---|
| Quantity of beams of different directions in a horizontal direction | 2 | 1 |
| Beam coverage in the horizontal direction | The beam coverage effect 1 is greater than the beam coverage effect 2 | |
| Horizontal beam width | The beam coverage effect 1 is greater than the beam coverage effect 2 | |
| Quantity of beams of different directions in a vertical direction | 2 | 4 |
| Beam coverage in the vertical direction | The beam coverage effect 1 is smaller than the beam coverage effect 2 | |
| Vertical beam width | The beam coverage effect 1 is smaller than the beam coverage effect 2 | |

With reference to FIG. 7C and Table 2, the reconfigurable network unit 720 switches between the working state 1 and the working state 2, so that the antenna system adjusts the quantity of the antenna subarrays in the antenna subarray groups connected to the K radio frequency channels. Further, in the reconfigurable network unit 720, switching is implemented between the beam coverage effect 1 in the working state 1 and the beam coverage effect 2 in the working state 2. In the horizontal direction, the beam coverage effect 1 has beams of two different directions, the beam coverage effect 2 has beams of one direction, horizontal coverage of the beam coverage effect 1 is greater than horizontal coverage of the beam coverage effect 2, and a horizontal beam width of the beam coverage effect 1 is greater than a horizontal beam width of the beam coverage effect 2. In the vertical direction, the beam coverage effect 1 may have beams of two different directions, the beam coverage effect 2 may have beams of four different directions, vertical coverage of the beam coverage effect 1 is smaller than vertical coverage of the beam coverage effect 2, and a vertical beam width of the beam coverage effect 1 is smaller than a vertical beam width of the beam coverage effect 2.

In Implementation 2, the beam coverage of the antenna system may be adjusted by switching between horizontal multi-channel distribution and horizontal+vertical multi-channel distribution of the radio frequency channel on the antenna array, to implement switching between "relatively wide horizontal multi-beam coverage and relatively wide vertical multi-beam coverage" and "relatively wide horizontal single-beam coverage and wide vertical multi-beam coverage" of the beam of the antenna system.

Figure 8A:
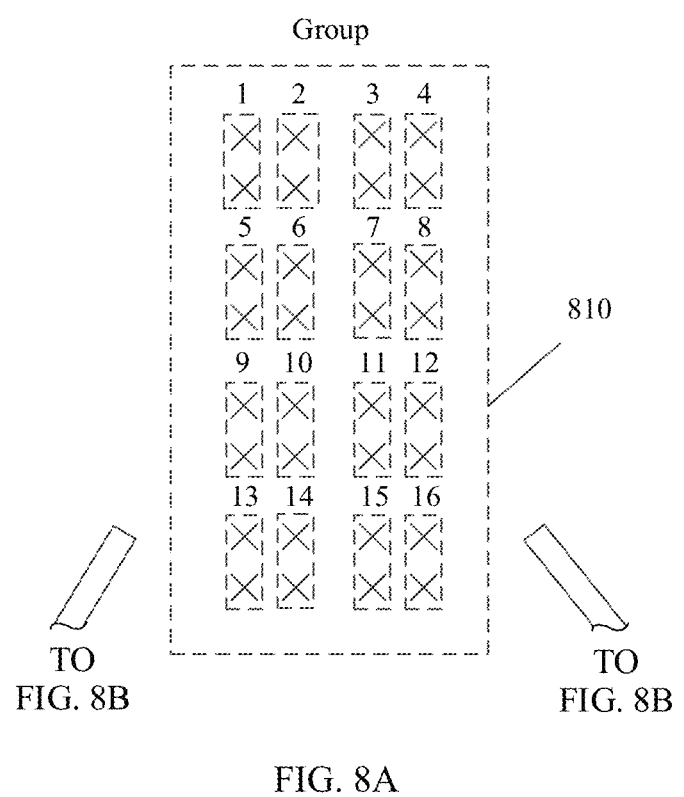
FIG. 8A to FIG. 8C are still another schematic diagram of beam coverage mode switching according to this application.
Figure 8B:
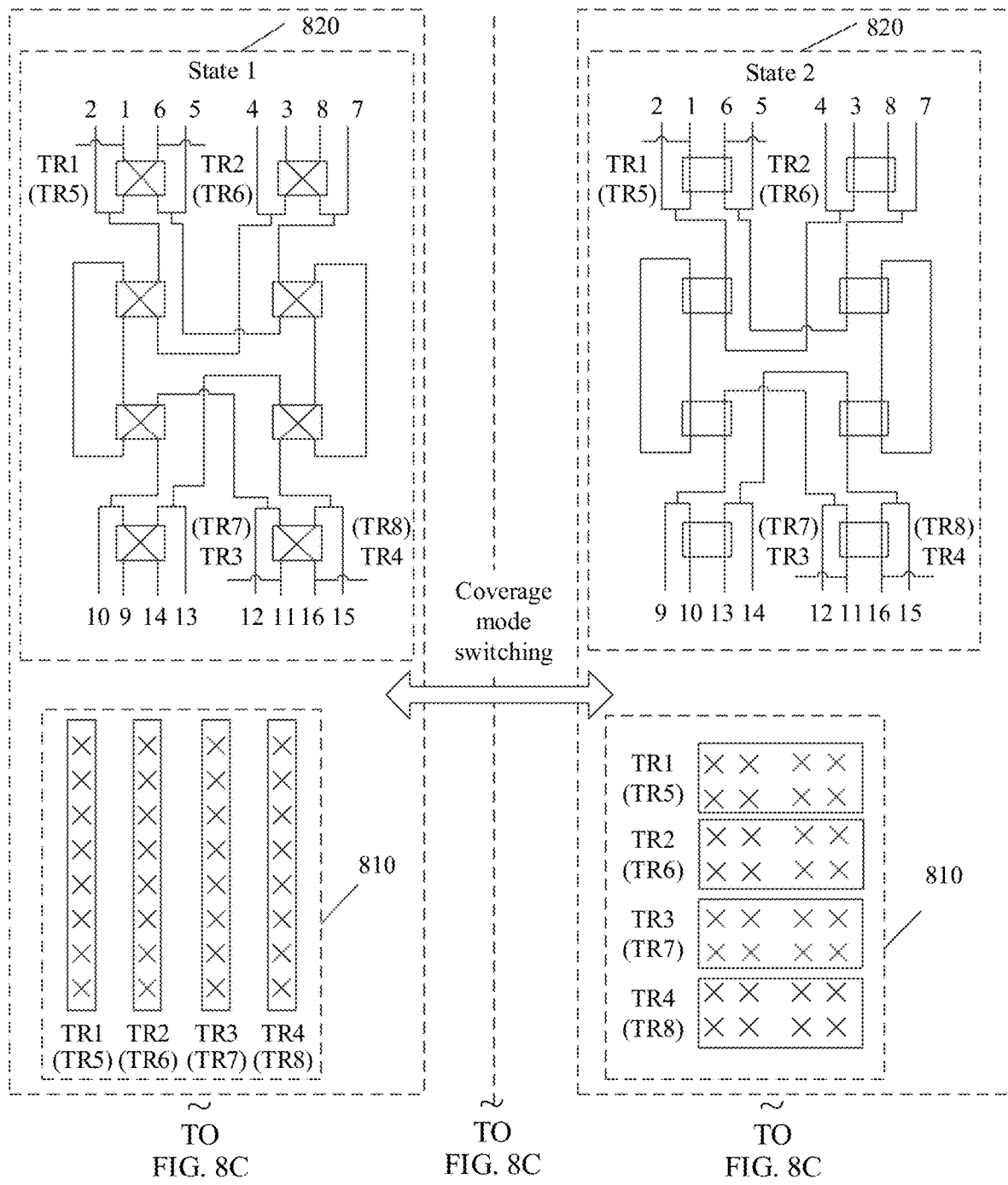
Figure 8C:
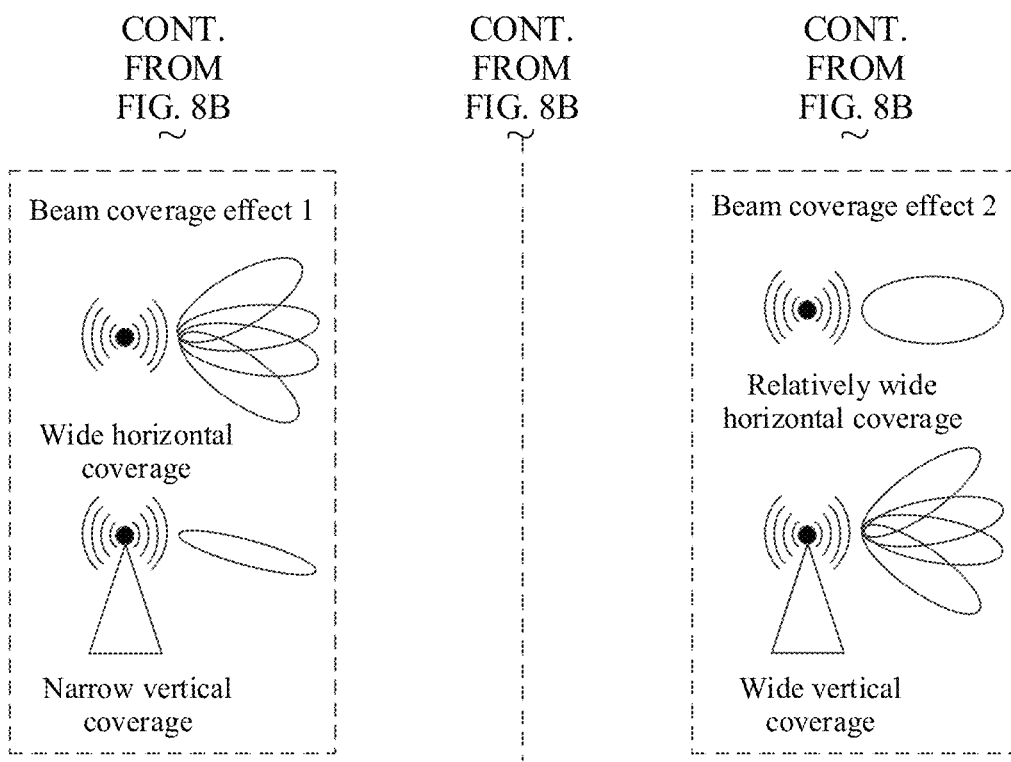

Implementation 3: Switching Between the Horizontal Coverage Mode and the Vertical Coverage Mode FIG. 8A to FIG. 8C are a schematic diagram of switching between the horizontal coverage mode and the vertical coverage mode. The following four steps may be included to implement coverage mode switching.

Step 1: Group Antenna Arrays, and Divide the Antenna Arrays into a Plurality of Antenna Subarrays.

Specifically, as shown in FIG. 8A and FIG. 8B, an antenna array 810 may be divided into sixteen antenna subarrays, each antenna subarray may include radiating elements of two rows by one column, and the radiating element has two dual polarizations. The sixteen antenna subarrays are arranged in four rows and four columns on an antenna array plane.

Step 2: Connect the Plurality of Antenna Subarrays and Radio Frequency Channels to a Reconfigurable Network Unit.

Specifically, as shown in FIG. 8B, each polarization of a reconfigurable network unit 820 may include two four-port transmission devices. In each polarization direction of the antenna array, feeding ports corresponding to the sixteen antenna subarrays may be divided into four antenna subarray groups by using eight four-port transmission devices, and the feeding ports corresponding to the four antenna subarray groups are separately connected to four radio frequency channels. Two polarizations of the radiating element are separately connected to two radio frequency channels, where TR1, TR2, TR3, and TR4 are radio frequency channels in a first polarization direction, and TR5, TR6, TR7, and TR8 are radio frequency channels in a second polarization direction. The reconfigurable network unit 820 in FIG. 8B shows a status of connection, by using the eight four-port transmission devices, between the radio frequency channels TR1, TR2, TR3, and TR4 in the first polarization direction of the antenna array 810 and the antenna subarrays in the antenna array 810. For a status of connection, by using the eight four-port transmission devices, between the radio frequency channels TR5, TR6, TR7, and TR8 in the second polarization direction of the antenna array 810 and the antenna subarrays in the antenna array 810, correspondingly refer to the radio frequency channels TR1, TR2, TR3, and TR4 in the first polarization direction.

Step 3: Adjust a Mapping Relationship Between the Antenna Subarray Group and the Antenna Subarray.

Specifically, when all the four-port transmission devices in the reconfigurable network unit 820 are in a state 1 (cross state), an antenna subarray 1, an antenna subarray 5, an antenna subarray 9, and an antenna subarray 13 form an antenna subarray group A to be connected to the radio frequency channel TR1; an antenna subarray 2, an antenna subarray 6, an antenna subarray 10, and an antenna subarray 14 form an antenna subarray group B to be connected to the radio frequency channel TR2; an antenna subarray 3, an antenna subarray 7, an antenna subarray 11, and an antenna subarray 15 form an antenna subarray group C to be connected to the radio frequency channel TR3; and an antenna subarray 4, an antenna subarray 8, an antenna subarray 12, and an antenna subarray 16 form an antenna subarray group D to be connected to the radio frequency channel TR4. In the state 1, one antenna subarray group includes the radiating elements of eight rows by one column in the antenna array. Therefore, a mapping relationship of the radio frequency channel on the antenna array is four radio frequency channels in a horizontal direction and one radio frequency channel in a vertical direction.

When all the four-port transmission devices in the reconfigurable network unit 820 are in a state 2 (parallel state), the antenna subarray 1, the antenna subarray 2, the antenna subarray 3, and the antenna subarray 4 form the antenna subarray group A to be connected to the radio frequency channel TR1; the antenna subarray 5, the antenna subarray 6, the antenna subarray 7, and the antenna subarray 8 form the antenna subarray group B to be connected to the radio frequency channel TR2; the antenna subarray 9, the antenna subarray 10, the antenna subarray 11, and the antenna subarray 12 form the antenna subarray group C to be connected to the radio frequency channel TR3; and the antenna subarray 13, the antenna subarray 14, the antenna subarray 15, and the antenna subarray 16 form the antenna subarray group D to be connected to the radio frequency channel TR4. In the working state 2 of the reconfigurable network unit 820, one antenna subarray group includes the radiating elements of two rows by four columns in the antenna array. Therefore, a mapping relationship of the radio frequency channel on the antenna array is one radio frequency channel in the horizontal direction and four radio frequency channels in the vertical direction.

Step 4: The Antenna Subarray Group Forms a Beam.

Because phase shift increments between radiating elements in an antenna subarray group connected to one radio frequency channel are consistent, beamforming may be implemented by using the radio frequency channel based on a signal received or sent by each radiating element in the antenna subarray group.

Therefore, beams of a plurality of directions may be generated by adjusting the phase shift increments in the antenna subarray group connected to the radio frequency channel.

As shown in FIG. 8B, in the working state 1 (cross state) of the reconfigurable network unit 820, the radio frequency channels TR1, TR2, TR3, and TR4 of the antenna array 810 may be distributed in the horizontal direction of the antenna array, each 8×1 radiating elements form one antenna subarray group (one radiating element in each row, and eight radiating elements in each column) to be connected to one radio frequency channel. Phase shift increments in different antenna subarray groups are different, so that a beam coverage effect 1 of an antenna system is that there are beams of four directions in the horizontal direction, and there are beams of only one direction in the vertical direction. In addition, in each antenna subarray group, a quantity of rows of radiating elements is greater than a quantity of columns of the radiating elements. Therefore, a horizontal width of each beam is greater than a vertical width. In other words, the beam coverage effect 1 of the antenna system is wide horizontal multi-beam coverage and narrow vertical single-beam coverage.

As shown in FIG. 8B, in the working state 2 (parallel state) of the reconfigurable network unit 820, the radio frequency channels TR1, TR2, TR3, and TR4 of the antenna array 810 may be distributed in the horizontal direction and the vertical direction of the antenna array, each 2×4 radiating elements form one antenna subarray group (four radiating elements in each row, and two radiating elements in each column) to be connected to one radio frequency channel. A beam coverage effect 2 of the antenna system is that there are beams of one direction in the horizontal direction, and there are beams of four directions in the vertical direction. In addition, in each antenna subarray group, a quantity of columns of radiating elements is greater than a quantity of rows of the radiating elements. Therefore, a vertical width of each beam is greater than a horizontal width. In other words, the beam coverage effect 2 of the antenna system is narrow horizontal single-beam coverage and wide vertical multi-beam coverage.

A larger quantity of antenna subarrays in the vertical direction in an antenna subarray group connected to a radio frequency channel indicates a narrower horizontal width of a beam generated by the antenna subarray group connected to the radio frequency channel. A larger quantity of antenna subarrays in the horizontal direction in an antenna subarray group connected to a radio frequency channel indicates a narrower vertical width of a beam generated by the antenna subarray group connected to the radio frequency channel. A larger quantity of antenna subarray groups that are distributed in the horizontal direction and connected to the K radio frequency channels indicates more beams of different directions generated by the antenna system in the horizontal direction. A larger quantity of antenna subarray groups that are distributed in the vertical direction and connected to the K radio frequency channels indicates more beams of different directions generated by the antenna system in the vertical direction. Therefore, a comparison result between the beam coverage effect 1 and the beam coverage effect 2 shown in FIG. 8C may be specifically shown in the following Table 3:

TABLE 3

| Comparison type | Beam coverage effect 1 | Beam coverage effect 2 |
|---|---|---|
| Quantity of beams of different directions in a horizontal direction | 4 | 1 |
| Beam coverage in the horizontal direction | The beam coverage effect 1 is greater than the beam coverage effect 2 | |
| Horizontal beam width | The beam coverage effect 1 is greater than the beam coverage effect 2 | |
| Quantity of beams of different directions in a vertical direction | 1 | 4 |
| Beam coverage in the vertical direction | The beam coverage effect 1 is smaller than the beam coverage effect 2 | |
| Vertical beam width | The beam coverage effect 1 is smaller than the beam coverage effect 2 | |

With reference to FIG. 8C and Table 3, the reconfigurable network unit 820 switches between the working state 1 and the working state 2, so that the antenna system adjusts the quantity of the antenna subarrays in the antenna subarray groups connected to the K radio frequency channels. Further, in the reconfigurable network unit 820, switching is implemented between the beam coverage effect 1 in the working state 1 and the beam coverage effect 2 in the working state 2. In the horizontal direction, the beam coverage effect 1 may have beams of four different directions, the beam coverage effect 2 has beams of only one fixed direction, horizontal coverage of the beam coverage effect 1 is greater than horizontal coverage of the beam coverage effect 2, and a horizontal beam width of the beam coverage effect 1 is greater than a horizontal beam width of the beam coverage effect 2. In the vertical direction, the beam coverage effect 1 has beams of only one fixed direction, the beam coverage effect 2 may have beams of four different directions, vertical coverage of the beam coverage effect 1 is smaller than vertical coverage of the beam coverage effect 2, and a vertical beam width of the beam coverage effect 1 is smaller than a vertical beam width of the beam coverage effect 2.

In Implementation 3, the beam coverage of the antenna system may be adjusted by switching between horizontal multi-channel distribution and vertical multi-channel distribution of the radio frequency channel on the antenna array, to implement switching between "wide horizontal multi-beam coverage and narrow vertical single-beam coverage" and "narrow horizontal single-beam coverage and wide vertical multi-beam coverage" of the beam of the antenna system.

The foregoing Implementation 1 to Implementation 3 are adjusting, on an entire antenna array plane, a spatial arrangement of the antenna subarrays connected to the radio frequency channel. A possible application scenario of the antenna system according to this application may be specifically described below through Implementation 4 and Implementation 5. In the antenna system according to this application, all radio frequency channels mapped to an upper half antenna plane of an antenna array may be transferred to a lower half antenna plane, or all radio frequency channels mapped to a lower half antenna plane of an antenna array may be transferred to an upper half antenna plane, so as to change a quantity of radiating elements, connected to each radio frequency channel, in a horizontal direction or a vertical direction of the antenna array, and further change coverage of the antenna system.

In the following Implementation 4, a reconfigurable network unit may include a plurality of four-port transmission devices shown in FIG. 4.

Implementation 4: Switch Between Radio Frequency Channel Distribution of the Upper Half Antenna Plane and Radio Frequency Channel Distribution of the Lower Half Antenna Plane of the Antenna Array, to Adjust Beam Coverage It should be noted that the following Implementation 4 is described by using a dual-polarized antenna array of 8×4 radiating elements and eight radio frequency channels as an example. Four radio frequency channels are mapped to an antenna array in each polarization direction, and TR is used to represent one radio frequency channel. To be specific, four radio frequency channels TR1, TR2, TR3, and TR4 are mapped to an antenna array in a first polarization direction, and four radio frequency channels TR5, TR6, TR7, and TR8 are mapped to an antenna array in a second polarization direction.

Figure 9A:
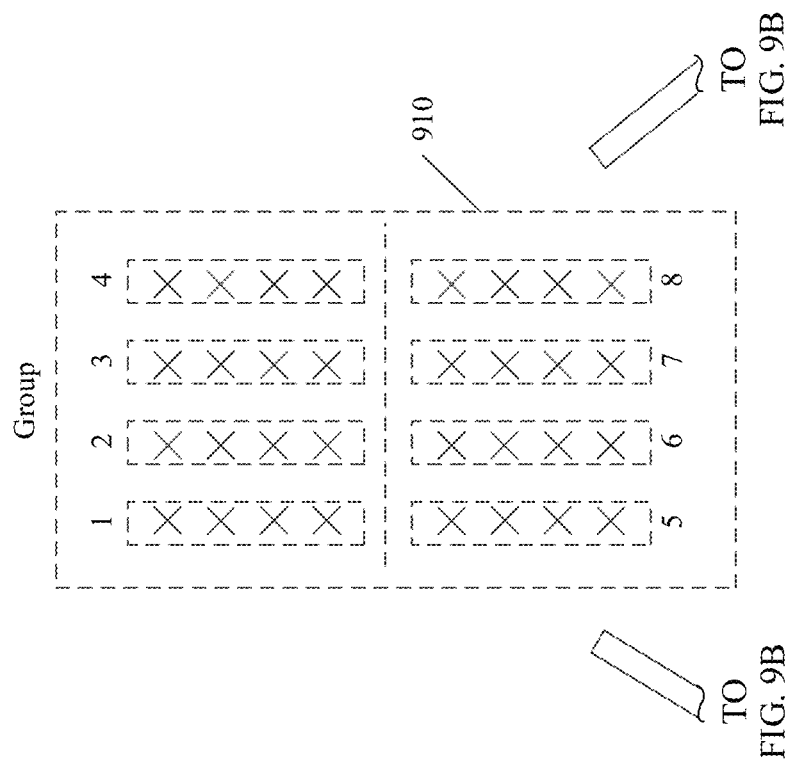
FIG. 9A to FIG. 9C are still another schematic diagram of beam coverage mode switching according to this application.
Figure 9B:
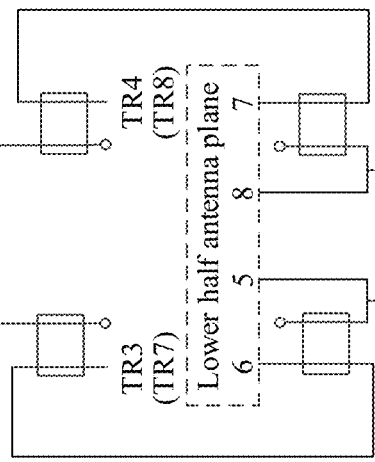
Figure 9B:
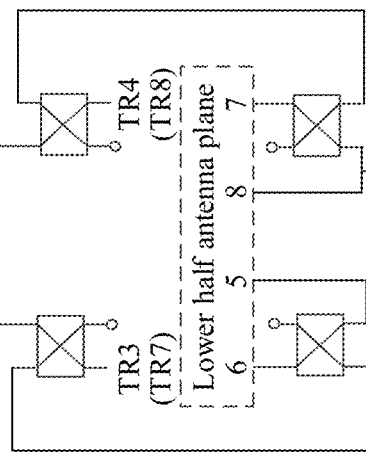
Figure 9C:
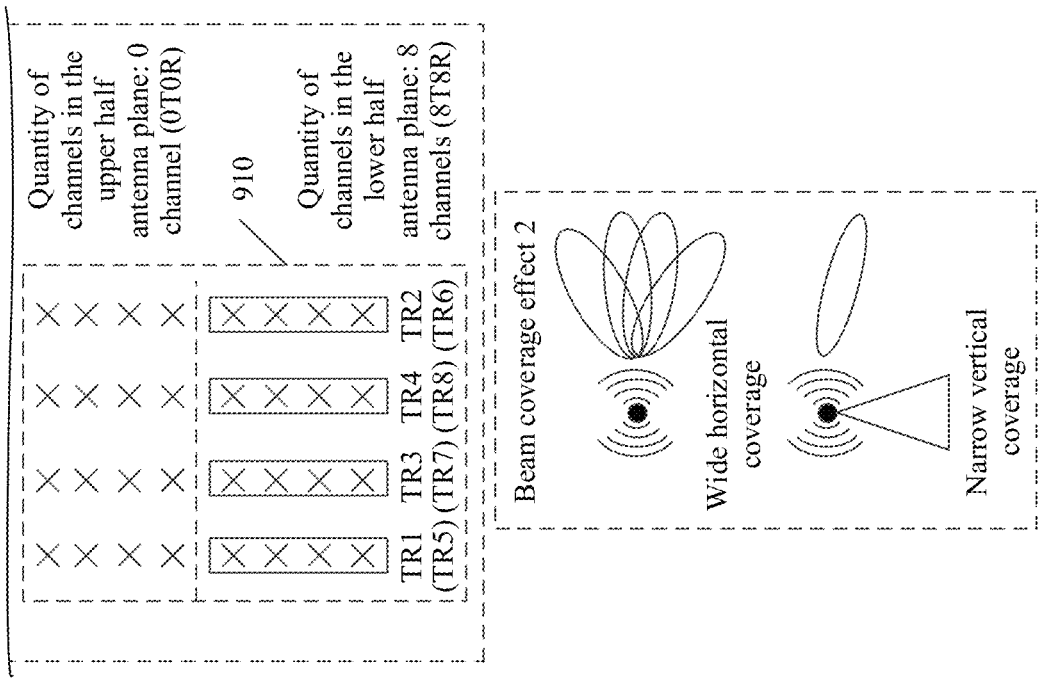

FIG. 9A to FIG. 9C are a schematic diagram of switching of a radio frequency channel between an upper half antenna plane and a lower half antenna plane of an antenna array. The switching of a radio frequency channel between an upper half antenna plane and a lower half antenna plane of an antenna array may include the following four steps.

Step 1: Group Antenna Arrays, and Divide the Antenna Arrays into a Plurality of Antenna Subarrays.

Specifically, as shown in FIG. 9A and FIG. 9B, an antenna array 910 may be divided into eight antenna subarrays, each antenna subarray may include radiating elements of four rows by one column, and the radiating element has two dual polarizations. The eight antenna subarrays are arranged in two rows and four columns on an antenna array plane.

Step 2: Connect the Plurality of Antenna Subarrays and Radio Frequency Channels to a Reconfigurable Network Unit.

Specifically, as shown in FIG. 9B, each polarization of a reconfigurable network unit 920 may include two four-port transmission devices. In each polarization direction of the antenna array, feeding ports corresponding to the eight antenna subarrays are divided into four antenna subarray groups by using the two four-port transmission devices, and the feeding ports corresponding to the four antenna subarray groups are separately connected to four radio frequency channels. Two polarizations of the radiating element are separately connected to two radio frequency channels, where TR1, TR2, TR3, and TR4 are radio frequency channels in a first polarization direction, and TR5, TR6, TR7, and TR8 are radio frequency channels in a second polarization direction. The reconfigurable network unit 920 in FIG. 9B shows a status of connection, by using the two four-port transmission devices, between the radio frequency channels TR1, TR2, TR3, and TR4 in the first polarization direction of the antenna array 910 and the antenna subarrays in the antenna array 910. For a status of connection, by using the two four-port transmission devices, between the radio frequency channels TR5, TR6, TR7, and TR8 in the second polarization direction of the antenna array 910 and the antenna subarrays in the antenna array 910, correspondingly refer to the radio frequency channels TR1, TR2, TR3, and TR4 in the first polarization direction.

Step 3: Adjust a Mapping Relationship Between the Antenna Subarray Group and the Antenna Subarray.

Specifically, when all the four-port transmission devices in the reconfigurable network unit 920 are in a working state 1 (cross state), an antenna subarray 1 and an antenna subarray 2 form an antenna subarray group A to be connected to the radio frequency channel TR1; an antenna subarray 3 and an antenna subarray 4 form an antenna subarray group B to be connected to the radio frequency channel TR2; an antenna subarray 5 and an antenna subarray 6 form an antenna subarray group C to be connected to the radio frequency channel TR3; and an antenna subarray 7 and an antenna subarray 8 form an antenna subarray group D to be connected to the radio frequency channel TR4. In the working state 1 of the reconfigurable network unit 920, one antenna subarray group includes the radiating elements of four rows by two columns in the antenna array. Therefore, a mapping relationship of the radio frequency channel on the antenna array is two radio frequency channels in a horizontal direction and two radio frequency channels in a vertical direction.

When all the four-port transmission devices in the reconfigurable network unit 920 are in a working state 2 (parallel state), the antenna subarray 5 independently forms the antenna subarray group A to be connected to the radio frequency channel TR1; the antenna subarray 6 independently forms the antenna subarray group B to be connected to the radio frequency channel TR2; the antenna subarray 7 independently forms the antenna subarray group C to be connected to the radio frequency channel TR3; and the antenna subarray 8 independently forms the antenna subarray group D to be connected to the radio frequency channel TR4. In the working state 2 of the reconfigurable network unit 920, one antenna subarray group includes the radiating elements of four rows by one column in the antenna array. Therefore, a mapping relationship of the radio frequency channel on the antenna array is four radio frequency channels in the horizontal direction and one radio frequency channel in the vertical direction.

Step 4: The Antenna Subarray Group Forms a Beam.

Because phase shift increments between radiating elements in an antenna subarray group connected to one radio frequency channel are consistent, beamforming may be implemented by using the radio frequency channel based on a signal received or sent by each radiating element in the antenna subarray group.

Therefore, beams of a plurality of directions may be generated by adjusting the phase shift increments in the antenna subarray group connected to the radio frequency channel.

In FIG. 9B, in the working state 1 of the reconfigurable network unit 920, the radio frequency channels TR1, TR2, TR3, and TR4 of the antenna array 910 may be distributed in the horizontal direction and the vertical direction of the antenna array, each 4×2 radiating elements form one antenna subarray group (two radiating elements in each row, and four radiating elements in each column) to be connected to one radio frequency channel. Phase shift increments in different antenna subarray groups are different, so that a beam coverage effect 1 of an antenna system is that there are beams of two directions in the horizontal direction, and there are also beams of two directions in the vertical direction. In addition, in each antenna subarray group, a quantity of rows of radiating elements is greater than a quantity of columns of the radiating elements. Therefore, a horizontal width of each beam is greater than a vertical width. In other words, the beam coverage effect 1 of the antenna system is relatively wide horizontal multi-beam coverage and relatively wide vertical multi-beam coverage.

In FIG. 9B, in the working state 2 of the reconfigurable network unit 920, the radio frequency channels TR1, TR2, TR3, and TR4 of the antenna array 910 may be distributed in the horizontal direction of the antenna array, each 4×2 radiating elements form one antenna subarray group (two radiating elements in each row, and four radiating elements in each column) to be connected to one radio frequency channel. A beam coverage effect 2 of the antenna system is that there are beams of two directions in the horizontal direction, and there are also beams of two directions in the vertical direction. In addition, in each antenna subarray group, a quantity of rows of radiating elements is greater than a quantity of columns of the radiating elements. Therefore, a horizontal width of each beam is greater than a vertical width. In other words, the beam coverage effect 2 of the antenna system is relatively wide horizontal multi-beam coverage and relatively wide vertical single-beam coverage, and horizontal coverage of each beam is wider than vertical coverage.

A larger quantity of antenna subarrays in the vertical direction in an antenna subarray group connected to a radio frequency channel indicates a narrower horizontal width of a beam generated by the antenna subarray group connected to the radio frequency channel. A larger quantity of antenna subarrays in the horizontal direction in an antenna subarray group connected to a radio frequency channel indicates a narrower vertical width of a beam generated by the antenna subarray group connected to the radio frequency channel. A larger quantity of antenna subarray groups that are distributed in the horizontal direction and connected to the K radio frequency channels indicates more beams of different directions generated by the antenna system in the horizontal direction. A larger quantity of antenna subarray groups that are distributed in the vertical direction and connected to the K radio frequency channels indicates more beams of different directions generated by the antenna system in the vertical direction. Therefore, a comparison result between the beam coverage effect 1 and the beam coverage effect 2 shown in FIG. 9C may be specifically shown in the following Table 4:

TABLE 4

| Comparison type | Beam coverage effect 1 | Beam coverage effect 2 |
|---|---|---|
| Quantity of beams of different directions in a horizontal direction | 2 | 4 |
| Beam coverage in the horizontal direction | | The beam coverage effect 1 is smaller than the beam coverage effect 2 |
| Horizontal beam width | | The beam coverage effect 1 is smaller than the beam coverage effect 2 |
| Quantity of beams of different directions in a vertical direction | 2 | 1 |
| Beam coverage in the vertical direction | | The beam coverage effect 1 is greater than the beam coverage effect 2 |
| Vertical beam width | | The beam coverage effect 1 is equal to the beam coverage effect 2 |

With reference to FIG. 9C and Table 4, the reconfigurable network unit 920 switches between the working state 1 and the working state 2, so that the antenna system adjusts the quantity of the antenna subarrays in the antenna subarray groups connected to the K radio frequency channels. Further, in the reconfigurable network unit 920, switching is implemented between the beam coverage effect 1 in the working state 1 and the beam coverage effect 2 in the working state 2. In the horizontal direction, the beam coverage effect 1 may have beams of two different directions, the beam coverage effect 2 may have beams of four different directions, horizontal coverage of the beam coverage effect 1 is smaller than horizontal coverage of the beam coverage effect 2, and a horizontal beam width of the beam coverage effect 1 is smaller than a horizontal beam width of the beam coverage effect 2. In the vertical direction, the beam coverage effect 1 may have beams of two fixed directions, the beam coverage effect 2 has beams of only one fixed direction, vertical coverage of the beam coverage effect 1 is greater than vertical coverage of the beam coverage effect 2, and a vertical beam width of the beam coverage effect 1 is equal to a vertical beam width of the beam coverage effect 2.

In Implementation 4, the beam coverage of the antenna system may be adjusted by switching of distribution of the radio frequency channels on the upper half antenna plane and the lower half antenna plane of the antenna array, to implement switching between "relatively wide horizontal multi-beam coverage and relatively wide vertical multi-beam coverage" and "wide horizontal multi-beam coverage and relatively wide vertical single-beam coverage" of the beam of the antenna system.

The following further specifically describes, through Implementation 5, an application scenario in which a radio frequency channel switches between the upper half antenna plane and the lower half antenna plane of the antenna array by using a five-port transmission device. Not limited to the four-port transmission device shown in FIG. 4, in Implementation 5, a reconfigurable network unit may include a plurality of five-port transmission devices shown in FIG. 5. The five-port transmission device includes two working states. In a working state 1, a port 1 implements directional transmission to a port 3 and a port 4, and a port 2 implements directional transmission to a port 5. In a working state 2, the port 1 implements directional transmission to the port 3, the port 2 implements directional transmission to the port 4, and the port 5 is disconnected.

It should be noted that the following Implementation 5 is described by using a dual-polarized antenna array of 8×4 radiating elements and eight radio frequency channels as an example. Four radio frequency channels are mapped to an antenna array in each polarization direction, and TR is used to represent one radio frequency channel. To be specific, four radio frequency channels TR1, TR2, TR3, and TR4 are mapped to an antenna array in a first polarization direction, and four radio frequency channels TR5, TR6, TR7, and TR8 are mapped to an antenna array in a second polarization direction.

Figure 10A:
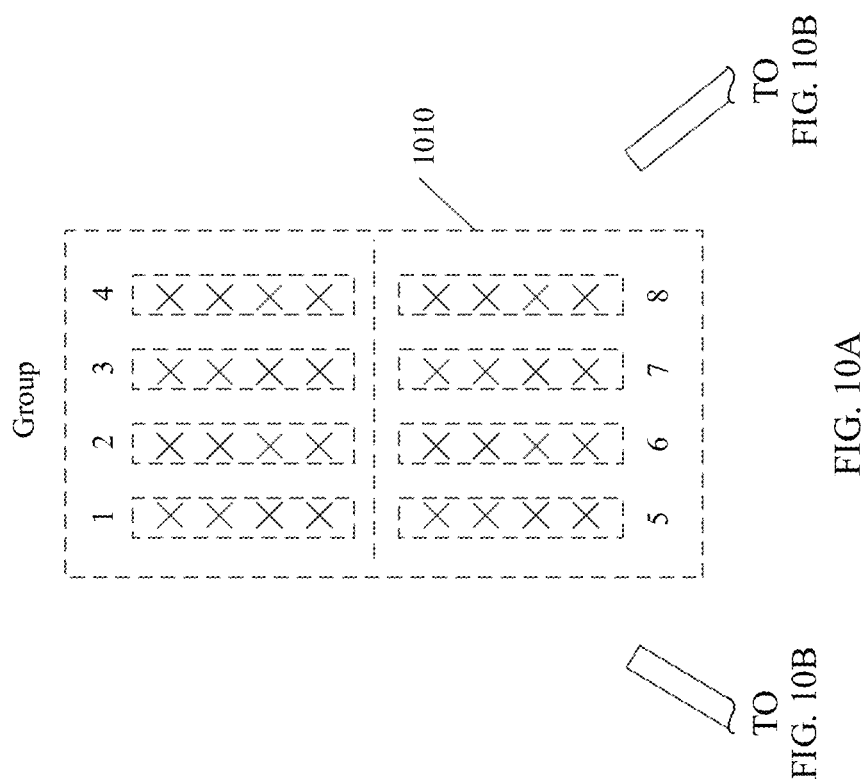
FIG. 10A to FIG. 10C are still another schematic diagram of beam coverage mode switching according to this application.
Figure 10B:
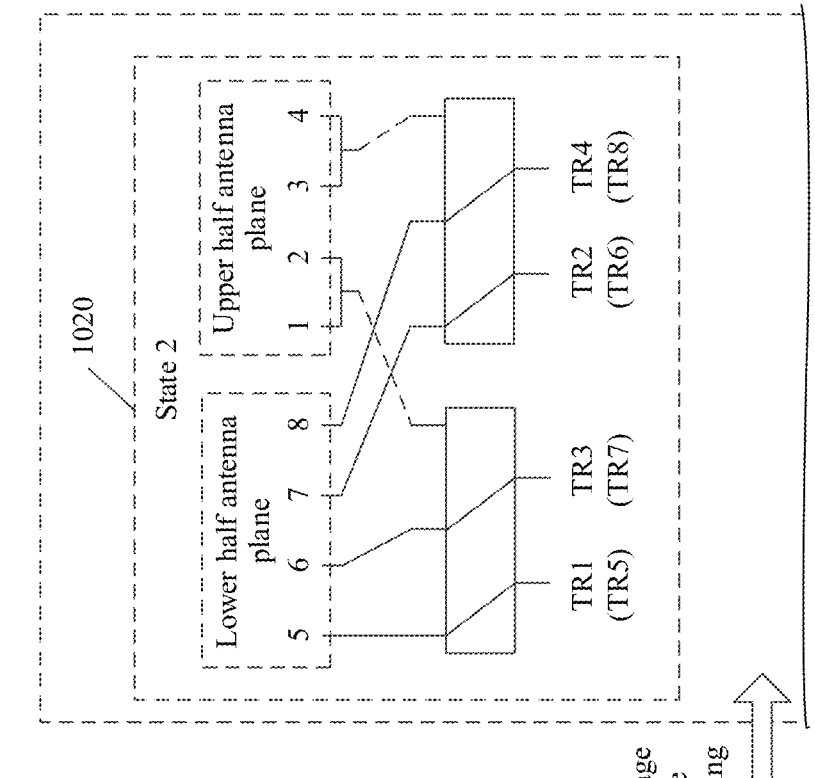
Figure 10B:
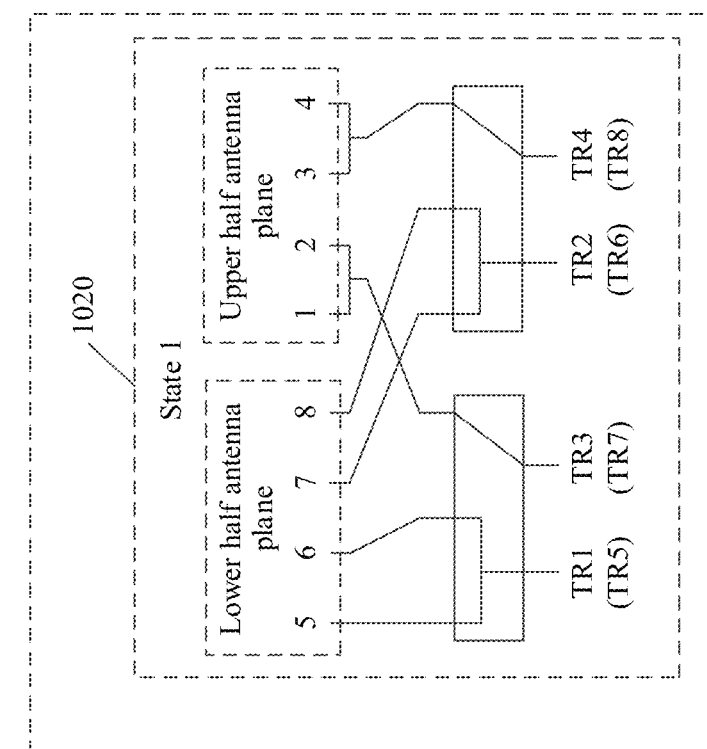
Figure 10C:
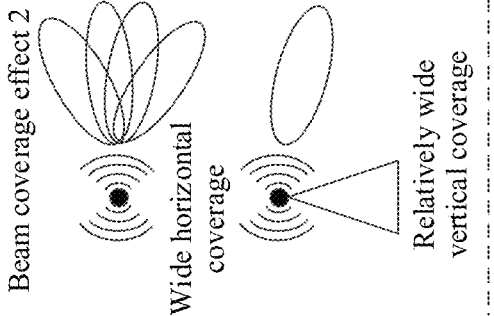
Figure 10C:
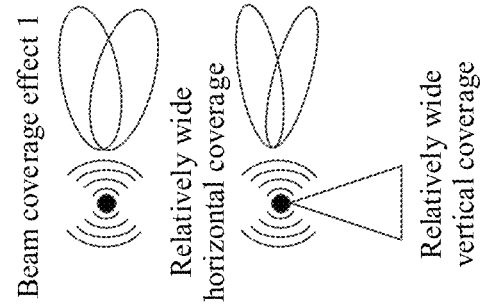

Implementation 5: Switch Between Radio Frequency Channel Distribution of the Upper Half Antenna Plane and Radio Frequency Channel Distribution of the Lower Half Antenna Plane of the Antenna Array, to Adjust Beam Coverage FIG. 10A to FIG. 10C are a schematic diagram of switching of a radio frequency channel between an upper half antenna plane and a lower half antenna plane of an antenna array by using a five-port transmission device. The switching of a radio frequency channel between an upper half antenna plane and a lower half antenna plane of an antenna array may include the following four steps.

Step 1: Group Antenna Arrays, and Divide the Antenna Arrays into a Plurality of Antenna Subarrays.

Specifically, as shown in FIG. 10A and FIG. 10B, an antenna array 1010 may be divided into eight antenna subarrays, each antenna subarray may include radiating elements of four rows by one column, and the radiating element has two dual polarizations. The eight antenna subarrays are arranged in two rows and four columns on an antenna array plane.

Step 2: Connect the Plurality of Antenna Subarrays and Radio Frequency Channels to a Reconfigurable Network Unit.

Figure 5:
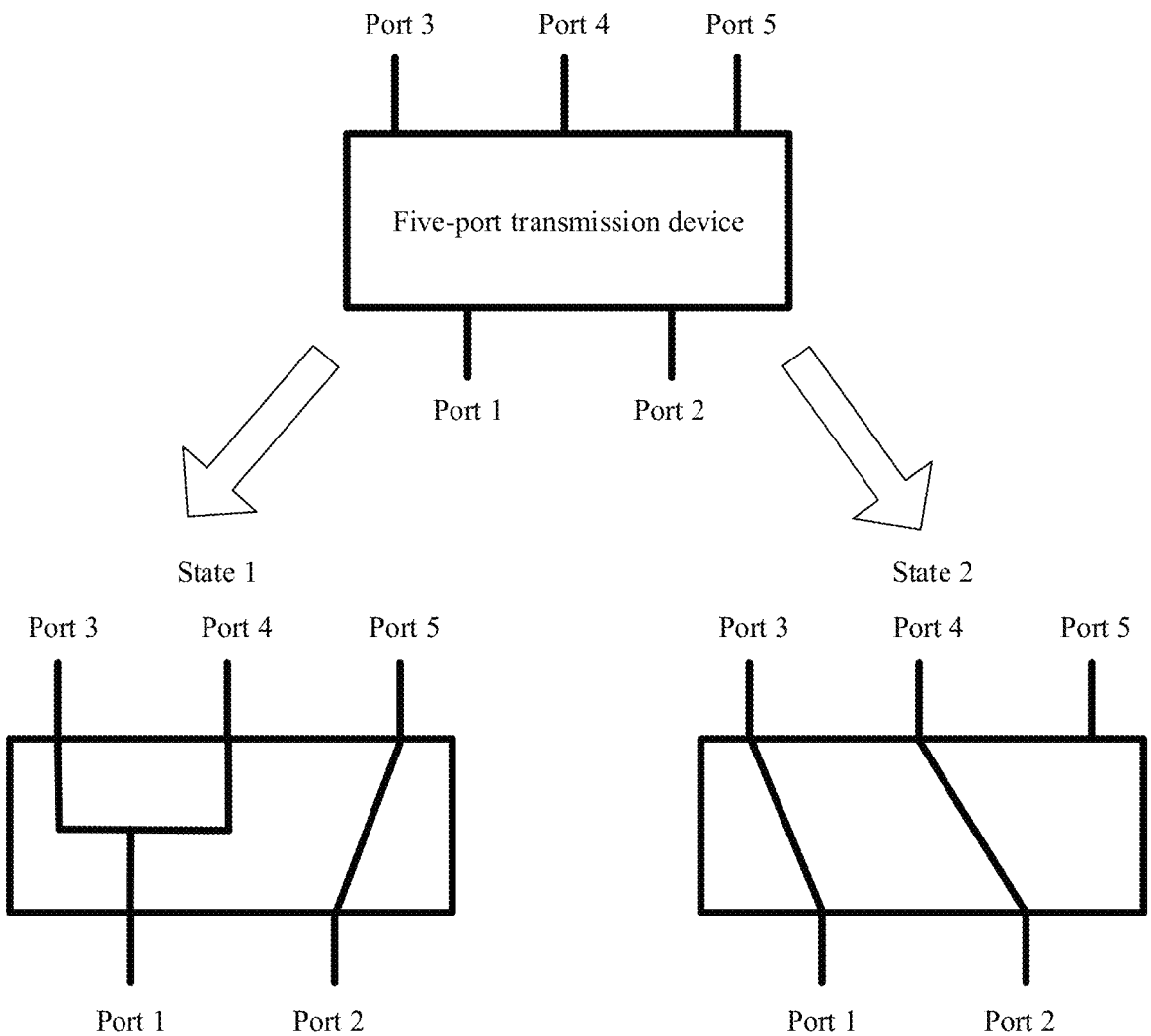
FIG. 5 is a schematic functional structural diagram of a five-port transmission device according to this application.

Specifically, as shown in FIG. 10B, each polarization of a reconfigurable network unit 1020 may include two five-port transmission devices shown in FIG. 5. In each polarization direction of the antenna array, feeding ports corresponding to the eight antenna subarrays are divided into four antenna subarray groups by using the two five-port transmission devices, and the feeding ports corresponding to the four antenna subarray groups are separately connected to four radio frequency channels. Two polarizations of the radiating element are separately connected to two radio frequency channels, where TR1, TR2, TR3, and TR4 are radio frequency channels in a first polarization direction, and TR5, TR6, TR7, and TR8 are radio frequency channels in a second polarization direction. The reconfigurable network unit 1020 in FIG. 10B shows a status of connection, by using the two five-port transmission devices, between the radio frequency channels TR1, TR2, TR3, and TR4 in the first polarization direction of the antenna array 1010 and the antenna subarrays in the antenna array 1010. For a status of connection, by using the two five-port transmission devices, between the radio frequency channels TR5, TR6, TR7, and TR8 in the second polarization direction of the antenna array 1010 and the antenna subarrays in the antenna array 1010, correspondingly refer to the radio frequency channels TR1, TR2, TR3, and TR4 in the first polarization direction.

Step 3: Adjust a Mapping Relationship Between the Antenna Subarray Group and the Antenna Subarray.

Specifically, when all the five-port transmission devices in the reconfigurable network unit 1020 are in a state 1, an antenna subarray 1 and an antenna subarray 2 form an antenna subarray group A to be connected to the radio frequency channel TR1; an antenna subarray 3 and an antenna subarray 4 form an antenna subarray group B to be connected to the radio frequency channel TR2; an antenna subarray 5 and an antenna subarray 6 form an antenna subarray group C to be connected to the radio frequency channel TR3; and an antenna subarray 7 and an antenna subarray 8 form an antenna subarray group D to be connected to the radio frequency channel TR4. In the state 1, one antenna subarray group includes the radiating elements of four rows by two columns in the antenna array. Therefore, a mapping relationship of the radio frequency channel on the antenna array is two radio frequency channels in a horizontal direction and two radio frequency channels in a vertical direction.

When all the five-port transmission devices in the reconfigurable network unit 1020 are in a state 2, the antenna subarray 5 independently forms the antenna subarray group A to be connected to the radio frequency channel TR1; the antenna subarray 6 independently forms the antenna subarray group B to be connected to the radio frequency channel TR2; the antenna subarray 7 independently forms the antenna subarray group C to be connected to the radio frequency channel TR3; and the antenna subarray 8 independently forms the antenna subarray group D to be connected to the radio frequency channel TR4. In the state 2, one antenna subarray group includes the radiating elements of four rows by one column in the antenna array. Therefore, a mapping relationship of the radio frequency channel on the antenna array is four radio frequency channels in the horizontal direction and one radio frequency channel in the vertical direction.

Step 4: The Antenna Subarray Group Forms a Beam.

Because phase shift increments between radiating elements in an antenna subarray group connected to one radio frequency channel are consistent, beamforming may be implemented by using the radio frequency channel based on a signal received or sent by each radiating element in the antenna subarray group.

Therefore, beams of a plurality of directions may be generated by adjusting the phase shift increments in the antenna subarray group connected to the radio frequency channel.

In FIG. 10B, in the working state 1 of the reconfigurable network unit 1020, the radio frequency channels TR1, TR2, TR3, and TR4 of the antenna array 1010 may be distributed in the horizontal direction and the vertical direction of the antenna array, each 4×2 radiating elements form one antenna subarray group (two radiating elements in each row, and four radiating elements in each column) to be connected to one radio frequency channel. Phase shift increments in different antenna subarray groups are different, so that a beam coverage effect 1 of an antenna system is that there are beams of two directions in the horizontal direction, and there are also beams of two directions in the vertical direction. In addition, in each antenna subarray group, a quantity of rows of radiating elements is greater than a quantity of columns of the radiating elements. Therefore, a horizontal width of each beam is greater than a vertical width. In other words, the beam coverage effect 1 of the antenna system is relatively wide horizontal multi-beam coverage and relatively wide vertical multi-beam coverage, and horizontal coverage of each beam is wider than vertical coverage.

In FIG. 10B, in the working state 2 of the reconfigurable network unit 1020, the radio frequency channels TR1, TR2, TR3, and TR4 of the antenna array 1010 may be distributed in the horizontal direction of the antenna array, each 4×2 radiating elements form one antenna subarray group (two radiating elements in each row, and four radiating elements in each column) to be connected to one radio frequency channel. A beam coverage effect 2 of the antenna system is that there are beams of two directions in the horizontal direction, and there are also beams of two directions in the vertical direction. In addition, in each antenna subarray group, a quantity of rows of radiating elements is greater than a quantity of columns of the radiating elements. Therefore, a horizontal width of each beam is greater than a vertical width. In other words, the beam coverage effect 2 of the antenna system is relatively wide horizontal multi-beam coverage and relatively wide vertical single-beam coverage, and horizontal coverage of each beam is wider than vertical coverage.

A larger quantity of antenna subarrays in the vertical direction in an antenna subarray group connected to a radio frequency channel indicates a narrower horizontal width of a beam generated by the antenna subarray group connected to the radio frequency channel. A larger quantity of antenna subarrays in the horizontal direction in an antenna subarray group connected to a radio frequency channel indicates a narrower vertical width of a beam generated by the antenna subarray group connected to the radio frequency channel. A larger quantity of antenna subarray groups that are distributed in the horizontal direction and connected to the K radio frequency channels indicates more beams of different directions generated by the antenna system in the horizontal direction. A larger quantity of antenna subarray groups that are distributed in the vertical direction and connected to the K radio frequency channels indicates more beams of different directions generated by the antenna system in the vertical direction. Therefore, a comparison result between the beam coverage effect 1 and the beam coverage effect 2 shown in FIG. 10C may be specifically shown in the following Table 5:

TABLE 5

| Comparison type | Beam coverage effect 1 | Beam coverage effect 2 |
| --- | --- | --- |
| Quantity of beams of different directions in a horizontal direction | 2 | 4 |
| Beam coverage in the horizontal direction | The beam coverage effect 1 is smaller than the beam coverage effect 2 | |
| Horizontal beam width | The beam coverage effect 1 is smaller than the beam coverage effect 2 | |
| Quantity of beams of different directions in a vertical direction | 2 | 1 |
| Beam coverage in the vertical direction | The beam coverage effect 1 is greater than the beam coverage effect 2 | |
| Vertical beam width | The beam coverage effect 1 is equal to the beam coverage effect 2 | |

With reference to FIG. 10C and Table 5, the reconfigurable network unit 1020 switches between the working state 1 and the working state 2, so that the antenna system adjusts the quantity of the antenna subarrays in the antenna subarray groups connected to the K radio frequency channels. Further, in the reconfigurable network unit 1020, switching is implemented between the beam coverage effect 1 in the working state 1 and the beam coverage effect 2 in the working state 2. In the horizontal direction, the beam coverage effect 1 may have beams of two different directions, the beam coverage effect 2 may have beams of four different directions, horizontal coverage of the beam coverage effect 1 is smaller than horizontal coverage of the beam coverage effect 2, and a horizontal beam width of the beam coverage effect 1 is smaller than a horizontal beam width of the beam coverage effect 2. In the vertical direction, the beam coverage effect 1 may have beams of two fixed directions, the beam coverage effect 2 has beams of only one fixed direction, vertical coverage of the beam coverage effect 1 is greater than vertical coverage of the beam coverage effect 2, and a vertical beam width of the beam coverage effect 1 is equal to a vertical beam width of the beam coverage effect 2.

In Implementation 5, the beam coverage of the antenna system may be adjusted by the reconfigurable unit by switching of distribution of the radio frequency channels on the upper half antenna plane and the lower half antenna plane of the antenna array, to implement switching between "relatively wide horizontal multi-beam coverage and relatively wide vertical multi-beam coverage" and "wide horizontal multi-beam coverage and narrow vertical single-beam coverage" of the beam of the antenna system.

The following Implementation 6 shows switching of a coverage area of a beam of an antenna system. In this application, a reconfigurable network unit is used to adjust a spacing between antenna subarrays in an antenna subarray group connected to at least one of K radio frequency channels, to change a width of a beam (that is, coverage of each beam) generated by the antenna subarray group connected to the at least one radio frequency channel. In addition, the reconfigurable network unit may be used to adjust a phase shift increment of the antenna subarray group connected to the at least one of the K radio frequency channels, to change a direction of the beam generated by the antenna subarray group connected to the at least one radio frequency channel, thereby implementing switching of the coverage area of the beam of the antenna system.

It should be noted that the following Implementation 6 is described by using a dual-polarized antenna array of 8×8 radiating elements and eight radio frequency channels as an example. Four radio frequency channels are mapped to an antenna array in each polarization direction, and TR is used to represent one radio frequency channel. To be specific, four radio frequency channels TR1, TR2, TR3, and TR4 are mapped to an antenna array in a first polarization direction, and four radio frequency channels TR5, TR6, TR7, and TR8 are mapped to an antenna array in a second polarization direction.

Figure 11A:
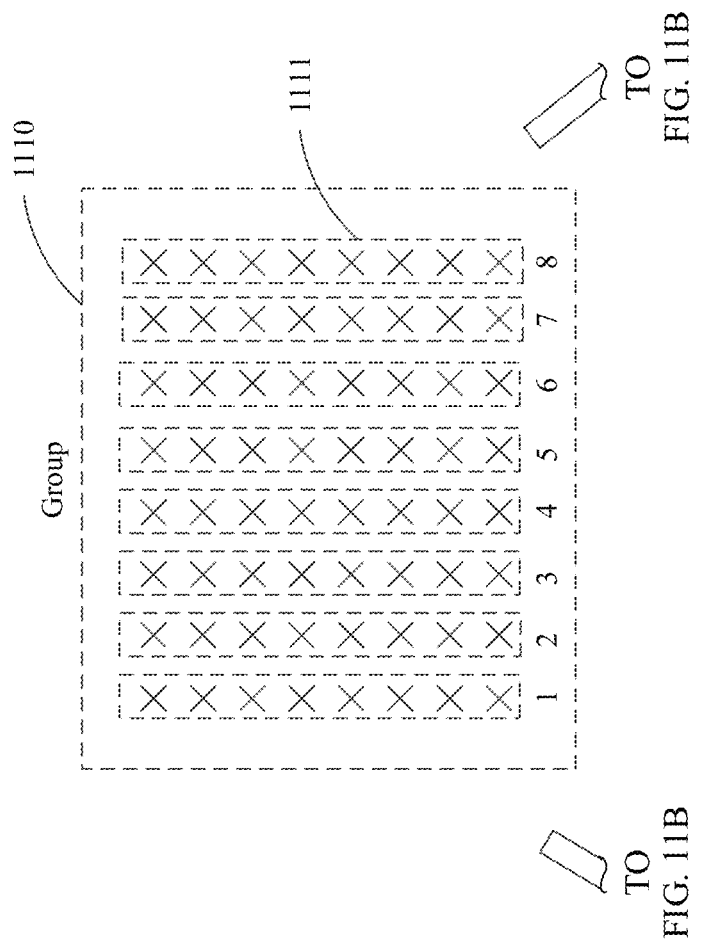
FIG. 11A and FIG. 11B are still another schematic diagram of beam coverage mode switching according to this application.
Figure 11B:
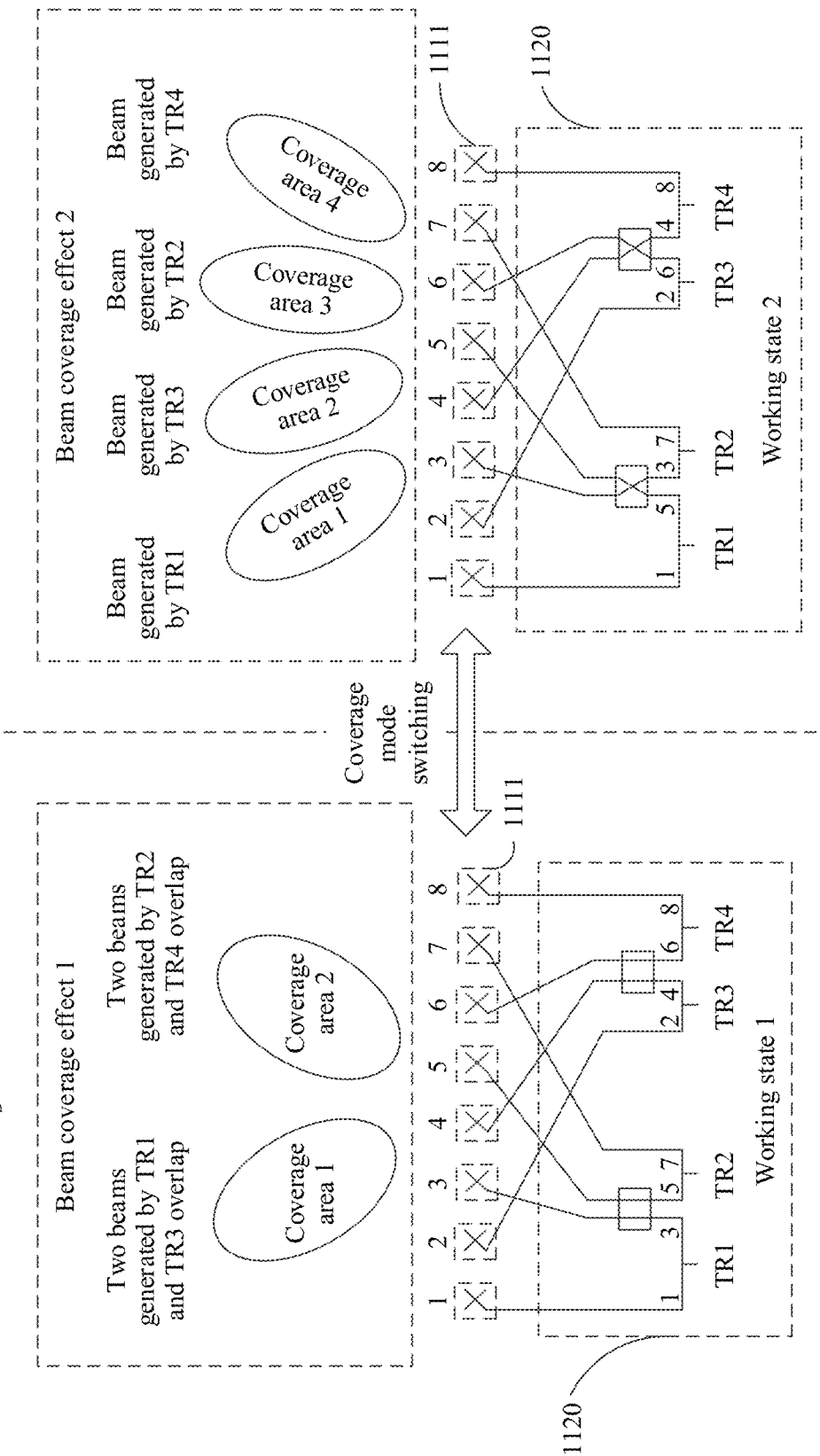

Implementation 6: Switching of the Coverage Area of the Beam of the Antenna System FIG. 11A and FIG. 11B are a schematic diagram of switching of a coverage area of a beam of an antenna system. As shown in FIG. 11B, when a reconfigurable network unit 1120 is in a working state 1, beams of the antenna system may form two coverage areas, and in each polarization direction of the antenna array, each coverage area includes two overlapping beams. For example, in the first polarization direction, a coverage area 1 is overlapping coverage of two beams generated by the TR1 and the TR3, and a coverage area 2 is overlapping coverage of two beams generated by the TR2 and the TR4. Two beams with a relatively wide horizontal width can be used to implement single sector 120-degree coverage.

As shown in FIG. 11B, when the reconfigurable network unit 1120 is in a working state 2, the beams of the antenna system may form four coverage areas, and in each polarization direction of the antenna array, each coverage area includes one beam. For example, in the first polarization direction, a coverage area 1 is beam coverage generated by the TR1, a coverage area 2 is beam coverage generated by the TR3, a coverage area 3 is beam coverage generated by the TR2, and a coverage area 4 is beam coverage generated by the TR4.

The following four steps may be included to implement switching of the coverage area of the beam.

Step 1: Group Antenna Arrays, and Divide the Antenna Arrays into a Plurality of Antenna Subarrays.

Specifically, as shown in FIG. 11A and FIG. 11B, an antenna array 1110 is an antenna array of 8×8 radiating elements. The antenna array 1110 may be divided into eight antenna subarrays 1111, and each antenna subarray 1111 may include one column of radiating elements in the antenna array 1110 (that is, the antenna subarrays are eight vertically-arranged radiating elements). The eight antenna subarrays 1111 are arranged horizontally on a plane on which the antenna array is located.

Step 2: Connect the Plurality of Antenna Subarrays and Radio Frequency Channels to the Reconfigurable Network Unit.

Specifically, as shown in FIG. 11B, each polarization of the reconfigurable network unit 1120 may include two four-port transmission devices shown in FIG. 4. In each polarization direction of the antenna array 1110, feeding ports corresponding to the eight antenna subarrays are divided into four antenna subarray groups by using the two four-port transmission devices, and the feeding ports corresponding to the four antenna subarray groups are separately connected to four radio frequency channels. Two polarizations of the radiating element are separately connected to two radio frequency channels, where TR1, TR2, TR3, and TR4 are radio frequency channels in a first polarization direction, and TR5, TR6, TR7, and TR8 are radio frequency channels in a second polarization direction. The reconfigurable network unit 1120 in FIG. 11B shows a status of connection of the antenna subarrays in the antenna array 1110. For a status of connection, by using the two four-port transmission devices, between the radio frequency channels TR5, TR6, TR7, and TR8 in the second polarization direction of the antenna array 1110 and the antenna subarrays in the antenna array 1110, correspondingly refer to the radio frequency channels TR1, TR2, TR3, and TR4 in the first polarization direction.

Step 3: Adjust a Mapping Relationship Between the Antenna Subarray Group and the Antenna Subarray.

Specifically, when the reconfigurable network unit 1120 is in a working state 1 (that is, when all four-port transmission devices are in a state 2: parallel transmission), an antenna subarray 1 and an antenna subarray 3 form an antenna subarray group A to be connected to the radio frequency channel TR1; an antenna subarray 5 and an antenna subarray 7 form an antenna subarray group B to be connected to the radio frequency channel TR2; an antenna subarray 2 and an antenna subarray 4 form an antenna subarray group C to be connected to the radio frequency channel TR3; and an antenna subarray 6 and an antenna subarray 8 form an antenna subarray group D to be connected to the radio frequency channel TR4. In the working state 1 of the reconfigurable network unit 1120, one antenna subarray group includes two columns of the radiating elements (one column of the radiating elements are one antenna subarray) in the antenna array 1110. Therefore, a mapping relationship of the radio frequency channel on the antenna array is four radio frequency channels in a horizontal direction and one radio frequency channel in a vertical direction. In addition, a distance between two antenna subarrays in an antenna subarray group connected to each radio frequency channel is two column spacings (a distance between adjacent antenna subarrays is one column spacing).

When the reconfigurable network unit 1120 is in a working state 2 (that is, when all the four-port transmission devices are in a state 1: cross transmission), the antenna subarray 1 and the antenna subarray 5 form the antenna subarray group A to be connected to the radio frequency channel TR1; the antenna subarray 3 and the antenna subarray 7 form the antenna subarray group B to be connected to the radio frequency channel TR2; the antenna subarray 2 and the antenna subarray 6 form the antenna subarray group C to be connected to the radio frequency channel TR3; and the antenna subarray 4 and the antenna subarray 8 form the antenna subarray group D to be connected to the radio frequency channel TR4. In the working state 2 of the reconfigurable network unit 1120, one antenna subarray group includes two columns of the radiating elements (one column of the radiating elements are one antenna subarray) in the antenna array. Therefore, a mapping relationship of the radio frequency channel on the antenna array is four radio frequency channels in the horizontal direction and one radio frequency channel in the vertical direction. In addition, a spacing between two antenna subarrays in an antenna subarray group connected to each radio frequency channel is four column spacings (a distance between adjacent antenna subarrays is one column spacing).

Step 4: The Antenna Subarray Group Forms a Beam.

Because phase shift increments between radiating elements in an antenna subarray group connected to one radio frequency channel are consistent, beamforming may be implemented by using the radio frequency channel based on a signal received or sent by each radiating element in the antenna subarray group.

Therefore, beams of a plurality of directions may be generated by adjusting the phase shift increments in the antenna subarray group connected to the radio frequency channel.

As shown in FIG. 11, in the working state 1 of the reconfigurable network unit 1120, the radio frequency channels TR1, TR2, TR3, and TR4 of the antenna array 1110 may be distributed in the horizontal direction of the antenna array. A larger column spacing between antenna subarrays in an antenna subarray group connected to each radio frequency channel indicates a narrower horizontal width of a formed beam, and the spacing between two antenna subarrays connected to each radio frequency channel is two column spacings. Therefore, a horizontal width of a beam of the reconfigurable network unit 1120 in the working state 1 is relatively wide, and single sector 120-degree coverage can be implemented by using two non-overlapping beam coverage areas. A beam coverage effect 1 (the coverage area 1 is overlapping coverage of a beam generated by the radio frequency channel TR1 and a beam generated by the radio frequency channel TR3, and the coverage area 2 is overlapping coverage of a beam generated by the radio frequency channel TR2 and a beam generated by the radio frequency channel TR4) of the antenna system may be implemented by adjusting phase shift increments of antenna subarray groups connected to different radio frequency channels.

As shown in FIG. 11, in the working state 2 of the reconfigurable network unit 1120, the radio frequency channels TR1, TR2, TR3, and TR4 of the antenna array 1110 may be distributed in the horizontal direction of the antenna array. A larger column spacing between antenna subarrays in an antenna subarray group connected to each radio frequency channel indicates a narrower horizontal width of a formed beam, and the spacing between two antenna subarrays connected to each radio frequency channel is four column spacings. Therefore, a horizontal width of a beam of the reconfigurable network unit 1120 in the working state 2 is relatively narrow, and single sector 120-degree coverage can be implemented only by using four non-overlapping beam coverage areas. A beam coverage effect 2 (the coverage area 1 is covered by a beam generated by the radio frequency channel TR1, the coverage area 2 is covered by a beam generated by the radio frequency channel TR3, the coverage area 3 is covered by a beam generated by the radio frequency channel TR2, and the coverage area 4 is covered by a beam generated by the radio frequency channel TR4) of the antenna system may be implemented by adjusting phase shift increments of antenna subarray groups connected to different radio frequency channels.

In conclusion, when the reconfigurable network unit 1120 is in the working state 1, the spacing between two antenna subarrays 1111 connected to each radio frequency channel is two column spacings, and when the reconfigurable network unit 1120 is in the working state 2, the spacing between two antenna subarrays 1111 connected to each radio frequency channel is four column spacings. A larger column spacing between two antenna subarrays connected to one radio frequency channel indicates a narrower horizontal width of a beam generated by an antenna subarray group connected to the radio frequency channel. Therefore, comparing the two working states of the reconfigurable network unit 1120, in the working state 1 of the reconfigurable network unit, a horizontal width of a beam formed by each radio frequency channel is relatively wide, and single sector 120-degree coverage can be implemented by using two non-overlapping beams. In the working state 2 of the reconfigurable network unit 1120, a horizontal width of a beam formed by each radio frequency channel is relatively narrow, and single sector 120-degree coverage can be implemented by using four non-overlapping beams.

The reconfigurable network unit 1120 switches from the working state 1 to the working state 2, a horizontal width of a beam formed by antenna subarrays connected to each radio frequency channel is narrowed, and a phase shift increment on each radio frequency channel is adjusted, thereby changing a direction of a beam generated by an antenna subarray group connected to each radio frequency channel.

In Implementation 6, the antenna system may change, by adjusting the mapping relationship between the radio frequency channel and the antenna subarrays in the connected antenna subarray group by using the reconfigurable network unit, the spacing between antenna subarrays connected to each radio frequency channel and the phase shift increment on each radio frequency channel. In this way, the beam coverage area of the antenna system is switched.

Figure 12:
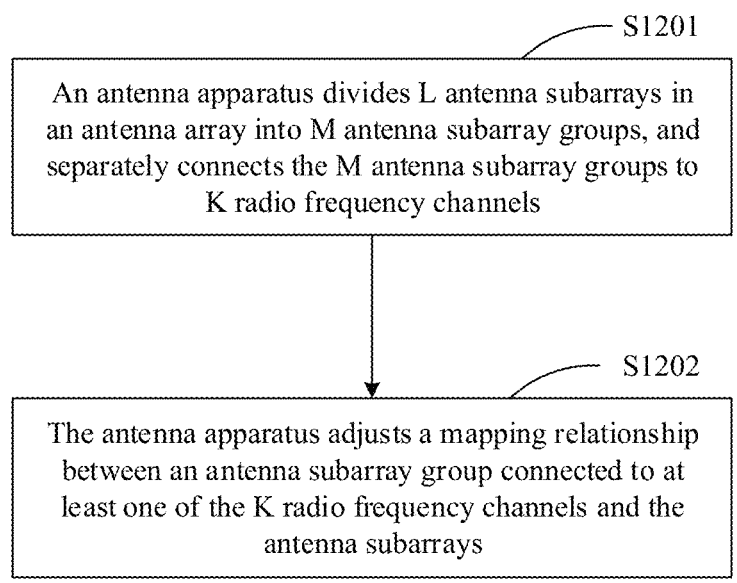
FIG. 12 is a schematic flowchart of a feeding network reconfiguration method according to this application.

FIG. 12 shows a feeding network reconfiguration method according to this application. The method includes the following two steps: S1201 and S1202.

S1201: An antenna system divides L antenna subarrays in an antenna array into M antenna subarray groups, and separately connects the M antenna subarray groups to K radio frequency channels. One polarization direction of one antenna subarray group is connected to one radio frequency channel, L is a positive integer greater than 1, M is a positive integer, and K is an integer multiple of M; and any one of the K radio frequency channels is configured to perform signal processing on a signal received by a connected antenna subarray group and/or a to-be-transmitted signal.

In specific implementation, polarization types of a radiating element in the antenna array include single polarization and dual polarization. When the radiating element in the antenna array is single-polarized, one antenna subarray group of the radiating element in the antenna array may have one feeding port, and the feeding port may be configured to simultaneously feed elements on each radiating element in the antenna subarray group. In this case, K=M. When the radiating element in the antenna array is dual-polarized, one antenna subarray group of the radiating element in the antenna array may have two feeding ports, and each feeding port may feed elements in a same polarization direction on each radiating element in the antenna subarray group. Polarization directions of dual polarization may be +45° and −45°. In this case, K=2M. Therefore, in this embodiment of the present invention, when the radiating element is multi-polarized, the antenna system can change, in each polarization direction, a quantity of antenna subarray groups in a horizontal direction and/or a vertical direction connected to the K radio frequency channels. In this way, coverage of a beam can be adjusted in each polarization direction of the antenna.

S1202: The antenna system adjusts a mapping relationship between an antenna subarray group connected to at least one of the K radio frequency channels and the antenna subarrays.

In a possible implementation, the antenna system may adjust a quantity X of antenna subarray groups in the horizontal direction connected to the K radio frequency channels, where beams generated in a same polarization direction of the X antenna subarray groups in the horizontal direction include E directions in the horizontal direction, both X and E are positive integers, and 1≤E≤X≤M. In other words, in this embodiment of this application, the antenna system may adjust the quantity of the antenna subarray groups in the horizontal direction connected to the K radio frequency channels. When each polarization of the antenna array corresponds, in the horizontal direction, to antenna subarray groups separately connected to a plurality of radio frequency channels, each polarization of the antenna system may perform multi-direction beam covering in the horizontal direction. When each polarization of the antenna array corresponds, in the horizontal direction, to an antenna subarray group connected to a single radio frequency channel, the antenna system may perform single-direction beam covering in the horizontal direction. Therefore, horizontal coverage of a beam of the antenna system may be changed by adjusting the quantity of the antenna subarray groups in the horizontal direction connected to the K radio frequency channels.

In another possible implementation, the antenna system may adjust a quantity Y of antenna subarray groups in the vertical direction connected to the K radio frequency channels, where beams generated in a same polarization direction of the Y antenna subarray groups in the vertical direction include F directions in the vertical direction, both Y and F are positive integers, and 1≤F≤Y≤M. In other words, in this embodiment of this application, the quantity of the antenna subarray groups in the vertical direction connected to the K radio frequency channels is adjusted. When each polarization of the antenna array corresponds, in the vertical direction, to antenna subarray groups separately connected to a plurality of radio frequency channels, each polarization of the antenna system may perform multi-direction beam covering in the vertical direction. When each polarization of the antenna array corresponds, in the vertical direction, to an antenna subarray group connected to a single radio frequency channel, the antenna system may perform single-direction beam covering in the vertical direction. Therefore, vertical coverage of the beam of the antenna system may be changed by adjusting the quantity of the antenna subarray groups in the vertical direction connected to the K radio frequency channels.

In another possible implementation, the adjusting, by the antenna system, a mapping relationship between an antenna subarray group connected to at least one of the K radio frequency channels and the antenna subarrays includes: adjusting a quantity of antenna subarrays in the horizontal direction included in the antenna subarray group connected to the at least one of the K radio frequency channels, where beams generated by antenna subarray groups that include different quantities of antenna subarrays in the horizontal direction have different widths in the horizontal direction. In other words, in this embodiment of this application, the quantity of the antenna subarrays in the horizontal direction included in the antenna subarray group connected to the radio frequency channel is changed. Because a larger quantity of antenna subarrays in the horizontal direction in an antenna subarray group indicates a narrower horizontal width of a beam generated by the antenna subarray group, coverage in the horizontal direction of the beam may be changed.

In another possible implementation, the antenna system may adjust a quantity of antenna subarrays in the vertical direction included in the antenna subarray group connected to the at least one of the K radio frequency channels, where beams generated by antenna subarray groups that include different quantities of antenna subarrays in the vertical direction have different widths in the vertical direction. In other words, in this embodiment of this application, the quantity of the antenna subarrays in the vertical direction included in the antenna subarray group connected to the radio frequency channel is adjusted. Because a larger quantity of antenna subarrays in the vertical direction in an antenna subarray group indicates a narrower vertical width of a beam generated by the antenna subarray group, coverage in the vertical direction of the beam may be changed.

In another possible implementation, the antenna system may adjust a spacing between antenna subarrays in the antenna subarray group connected to the at least one of the K radio frequency channels, to change a width of a beam generated by the antenna subarray group connected to the at least one radio frequency channel. In other words, in this embodiment of this application, a horizontal spacing between the antenna subarrays in the antenna subarray group connected to the radio frequency channel is changed. Because a larger horizontal spacing between antenna subarrays connected to one radio frequency channel indicates a narrower horizontal width of a radio frequency channel beam, and a larger vertical spacing between antenna subarrays connected to one radio frequency channel indicates a narrower vertical width of a radio frequency channel beam, coverage in the horizontal direction and the vertical direction of the beam may be changed.

In another possible implementation, the antenna system may adjust a phase shift increment in the antenna subarray group connected to the at least one of the K radio frequency channels. In other words, in this embodiment of this application, the radio frequency channel is changed to connect to different antenna subarrays, to change the phase shift increment in the antenna subarray group connected to the radio frequency channel. The beam generated by the antenna subarray group connected to the radio frequency channel may have different directions when the phase shift increment is different, so that a direction of the beam may be changed.

In this embodiment of the present invention, the antenna system adjusts a mapping relationship between an antenna subarray group connected to each radio frequency channel and the antenna subarrays, to change a quantity of radiating elements in the horizontal direction and/or the vertical direction in the antenna subarray group connected to each radio frequency channel, or may change distribution status of the radio frequency channels in the horizontal direction and/or the vertical direction, to change coverage of a beam generated by the antenna subarray group connected to the at least one radio frequency channel. A larger quantity of radiating elements in the horizontal direction in an antenna subarray group indicates a narrower beam width on a horizontal plane of a beam generated by the antenna subarray group, and a larger quantity of radiating elements in the vertical direction in the antenna subarray group indicates a narrower beam width of the beam generated by the antenna subarray group. Therefore, a width of a beam generated by the antenna subarray group connected to each radio frequency channel and a beam direction of a beam generated by an antenna subarray group connected to each of the K radio frequency channels may be adjusted. Beam coverage of the antenna system may be dynamically adjusted by adjusting the beam width and the beam direction.

It should be noted that, for specific content of the embodiment shown in FIG. 12, refer to functions of the control unit and the reconfigurable network unit in the embodiment shown in FIG. 2. For a specific application scenario, refer to the implementations shown in FIG. 6 to FIG. 11. Details are not described herein again.

Figure 13:
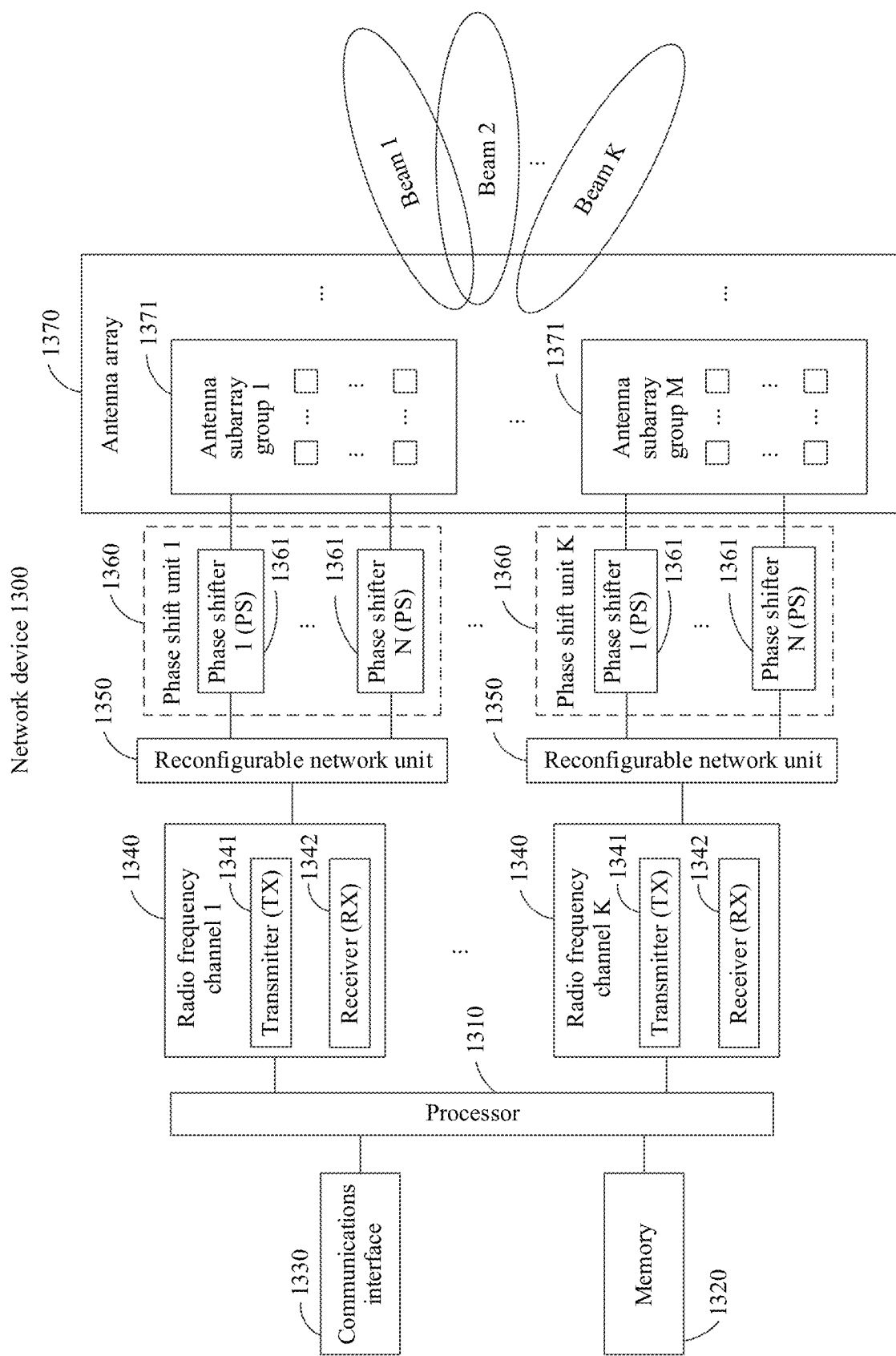
FIG. 13 is a schematic structural diagram of a network device according to this application.

FIG. 13 is a schematic structural diagram when the antenna system shown in FIG. 2 is applied to a terminal device. FIG. 13 shows a network device 1300 according to some embodiments of this application. As shown in FIG. 13, the network device 1300 may include one or more processors 1310, a memory 1320, a communications interface 1330, at least one radio frequency channel 1340, a reconfigurable network unit 1350, a phase shift unit 1360, and an antenna array 1370.

The communications interface 1330 may be configured for communication between the network device 1300 and another communications device, for example, a terminal device or another network device. Specifically, the communications interface 1330 may be a long term evolution (LTE) (4G) communications interface, a 5G communications interface, or a future new radio communications interface. Not limited to a wireless communications interface, the network device 1300 may be further provided with a wired communications interface 1330 to support wired communication. For example, a backhaul connection between one network device 1300 and another network device 1300 may be a wired communication connection.

The radio frequency channel 1340 may include a transmitter (TX) 1341 and a receiver (RX) 1342. The transmitter (TX) 1341 may be configured to perform transmission processing, for example, implement directional sending through beamforming, on a signal output by the network device processor 1310. The receiver (RX) 1342 may be configured to perform receiving processing, for example, implement directional receiving through beamforming, on a mobile communication signal received by the antenna array 1370. In some embodiments of this application, the transmitter 1341/receiver 1342 may include a beamforming controller, configured to multiply a transmitted signal/a received signal by a weight vector, to control directional sending/receiving of the signal.

In some embodiments of this application, the transmitter 1341 and the receiver 1342 may be considered as a wireless modem. The network device 1300 includes at least one radio frequency channel 1340. The antenna array 1370 may be configured to convert electromagnetic energy in a transmission line into an electromagnetic wave in free space, or convert an electromagnetic wave in free space into electromagnetic energy in a transmission line.

The memory 1320 is coupled to the processor 1310, and is configured to store various software programs and/or a plurality of sets of instructions. Specifically, the memory 1320 may include a high-speed random access memory, and may further include a non-volatile memory, for example, one or more disk storage devices, a flash memory device, or another non-volatile solid-state storage device. The memory 1320 may store an operating system (briefly referred to as a system below), for example, an embedded operating system such as uCOS, VxWorks, or RTLinux. The memory 1320 may further store a network communications program. The network communications program may be used to communicate with one or more additional devices, one or more terminal devices, and one or more network devices.

The processor 1310 may be configured to perform radio channel management, calling implementation, and communications link establishment and disconnecting, and provide cell handover control and the like for a terminal in a local control area. Specifically, the processor 1310 may include a baseband unit (BBU) (configured to perform a function such as baseband encoding/decoding), a digital signal processor (DSP), a micro control unit (MCU), an administration module/communication module (AM/CM) (a center for speech channel switching and information switching), a basic module (BM) (configured to implement functions of call processing, signaling processing, radio resource management, radio link management, and circuit maintenance), a transcoder and submultiplexer (TCSM) (configured to implement functions of multiplexing/demultiplexing and code conversion), and the like. The processor 1310 may be configured to control the reconfigurable network unit 1350 to adjust a mapping relationship between an antenna subarray group connected to at least one of K radio frequency channels and antenna subarrays, to change coverage of a beam generated by the antenna subarray group connected to the at least one radio frequency channel. For a specific function of the processor 1310, refer to the control unit 210 in the antenna system 200 shown in FIG. 2 and the control unit in another embodiment. Details are not described herein again.

The reconfigurable network unit 1350 may be configured to adjust a mapping relationship between a radio frequency channel and an antenna subarray in an antenna array, to change beam coverage of an antenna system. In specific implementation, the reconfigurable network unit 1350 and the phase shift unit 1360 may be coupled as a feeding network to feed an antenna element in the antenna array. For a specific function of the reconfigurable network unit 1350, refer to the reconfigurable network unit 230 in the antenna system 200 shown in FIG. 2 and the reconfigurable network unit in another embodiment. Details are not described herein again.

In this embodiment of this application, the processor 1310 may be configured to read and execute a computer-readable instruction. Specifically, the processor 1310 may be configured to invoke a program stored in the memory 1320, for example, a program for implementing, on a side of the network device 1300, the signal transmission method according to one or more embodiments of this application, and execute an instruction included in the program. When the program is executed by the processor 1310, functions of the antenna system shown in FIG. 2 may be implemented.

It may be understood that the network device 1300 may be the network device 101 in the wireless communications system 100 shown in FIG. 1, and may be implemented as a base transceiver station, a wireless transceiver, a basic service set (BSS), an extended service set (ESS), a NodeB, an eNodeB, a connection point, a TRP, or the like.

It should be noted that the network device 1300 shown in FIG. 13 is only an implementation of the embodiments of this application. In actual application, the network device 1300 may further include more or fewer components, and this is not limited herein.

In the foregoing embodiments, the description of each embodiment has respective focuses. For a part that is not described in detail in an embodiment, refer to related descriptions in other embodiments.

Figure 14:
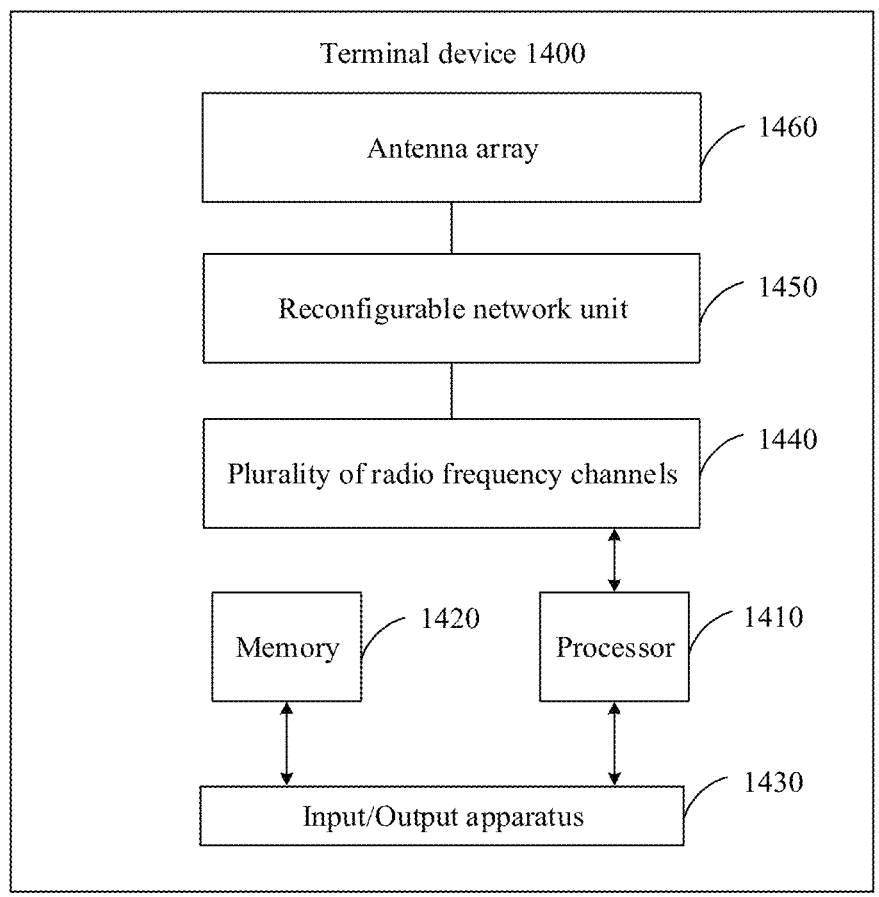
FIG. 14 is a schematic structural diagram of a terminal device according to this application.

FIG. 14 is a schematic structural diagram when the antenna system shown in FIG. 2 is applied to a terminal device. FIG. 14 is a schematic structural diagram of a terminal device according to this application. A terminal device 1400 in FIG. 14 includes a processor 1410, a memory 1420, an input/output apparatus 1430, a plurality of radio frequency channels 1440, a reconfigurable network unit 1450, and an antenna array 1460. The processor 1410 is mainly configured to: process a communications protocol and communication data, control the terminal device, execute a software program, process data of the software program, and the like. The memory 1420 is mainly configured to store a software program and data. The plurality of radio frequency channels are mainly configured to: perform conversion between a baseband signal and a radio frequency signal, and process the radio frequency signal. The antenna array 1460 is mainly configured to receive and transmit a radio frequency signal in an electromagnetic wave form. The input/output apparatus 1430, such as a touchscreen, a display screen, or a keyboard, is mainly configured to receive data input by a user and output data to the user. It should be noted that some types of terminal devices may not have the input/output apparatus. The reconfigurable network unit 1450 may be configured to adjust a mapping relationship between a radio frequency channel and an antenna subarray in an antenna array, to change beam coverage of an antenna system. In specific implementation, the reconfigurable network unit 1450 and a phase shift unit may be coupled as a feeding network to feed an antenna element in the antenna array. For a specific function of the reconfigurable network unit 1450 in this application, refer to another embodiment. Details are not described herein again.

When data needs to be sent, after performing baseband processing on the to-be-sent data, the processor 1410 outputs a baseband signal to a radio frequency circuit. After performing radio frequency processing on the baseband signal, the plurality of radio frequency channels 1440 send the radio frequency signal to the outside in an electromagnetic wave form by using an antenna. When data is sent to a terminal, the radio frequency channel 1440 receives a radio frequency signal by using the antenna array 1460, converts the radio frequency signal into a baseband signal, and outputs the baseband signal to the processor 1410. The processor 1410 converts the baseband signal into data, and processes the data. For ease of description, FIG. 14 shows only one memory 1420 and one processor 1410. In an actual terminal product, there may be one or more processors and one or more memories. The memory 1420 may also be referred to as a storage medium, a storage device, or the like. The memory may be disposed independent of the processor, or may be integrated with the processor. This is not limited in this embodiment of this application.

In this embodiment of this application, the antenna array 1460 having a receiving and sending function and the plurality of radio frequency channels 1440 may be considered as a transceiver unit of the terminal device, and the processor having a processing function may be considered as a processing unit of the terminal device. The transceiver unit may also be referred to as a transceiver, a transceiver machine, a transceiver apparatus, or the like. The processing unit may also be referred to as a processor, a processing board, a processing module, a processing apparatus, or the like. The processing unit may be a central processing unit (CPU), a network processor (NP), or a combination of a CPU and an NP. The processing unit may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL for short), or any combination thereof. Optionally, a component that is in the transceiver unit and that is configured to implement a receiving function may be considered as a receiving unit, and a component that is in the transceiver unit and that is configured to implement a sending function may be considered as a sending unit. In other words, the transceiver unit includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like. When the communications apparatus is a chip, the chip includes a transceiver unit and a processing unit. The transceiver unit may be an input/output circuit or a communications interface. The processing unit is a processor, a microprocessor, or an integrated circuit integrated on the chip.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to example embodiments, and the involved actions and modules are not necessarily required by this application.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a magnetic disk, an optical disc, a read-only memory (ROM), or a random access memory (RAM).

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An antenna system, comprising an antenna array, a control circuit, a reconfigurable network circuit, and K radio frequency channels, wherein
    the antenna array comprises L antenna subarrays, wherein L is a positive integer greater than 1;
    the reconfigurable network circuit connects the antenna array and the K radio frequency channels and is configured to: divide the L antenna subarrays into M antenna subarray groups, and separately connect the M antenna subarray groups to the K radio frequency channels, wherein one polarization direction of one antenna subarray group is connected to one radio frequency channel; and M is a positive integer, and K is an integer multiple of M;
    any one of the K radio frequency channels is configured to perform signal processing on a signal received by a connected antenna subarray group and/or a to-be-transmitted signal; and
    the control circuit is configured to control the reconfigurable network circuit to adjust a mapping relationship between an antenna subarray group connected to at least one of the K radio frequency channels and the antenna subarrays.

2. The system according to claim 1, wherein that the control circuit is configured to control the reconfigurable network circuit to adjust a mapping relationship between an antenna subarray group connected to at least one of the K radio frequency channels and the antenna subarrays comprises:
    the control circuit is configured to control the reconfigurable network circuit to adjust a quantity X of antenna subarray groups in a horizontal direction connected to the K radio frequency channels, wherein beams generated in a same polarization direction of the X antenna subarray groups in the horizontal direction comprise E directions in the horizontal direction, both X and E are positive integers, and $1 \leq E \leq X \leq M$.

3. The system according to claim 1, wherein that the control circuit is configured to control the reconfigurable network circuit to adjust a mapping relationship between an antenna subarray group connected to at least one of the K radio frequency channels and the antenna subarrays comprises:
    the control circuit is configured to control the reconfigurable network circuit to adjust a quantity Y of antenna subarray groups in a vertical direction connected to the K radio frequency channels, wherein beams generated in a same polarization direction of the Y antenna subarray groups in the vertical direction comprise F directions in the vertical direction, both Y and F are positive integers, and $1 \leq F \leq Y \leq M$.

4. The system according to claim 1, wherein that the control circuit is configured to control the reconfigurable network circuit to adjust a mapping relationship between an antenna subarray group connected to at least one of the K radio frequency channels and the antenna subarrays comprises:

the control circuit is configured to control the reconfigurable network circuit to adjust a quantity of antenna subarrays in the horizontal direction comprised in the antenna subarray group connected to the at least one of the K radio frequency channels, wherein beams generated by antenna subarray groups that comprise different quantities of antenna subarrays in the horizontal direction have different widths in the horizontal direction.

5. The system according to claim 1, wherein that the control circuit is configured to control the reconfigurable network circuit to adjust a mapping relationship between an antenna subarray group connected to at least one of the K radio frequency channels and the antenna subarrays comprises:

the control circuit is configured to control the reconfigurable network circuit to adjust a quantity of antenna subarrays in the vertical direction comprised in the antenna subarray group connected to the at least one of the K radio frequency channels, wherein beams generated by antenna subarray groups that comprise different quantities of antenna subarrays in the vertical direction have different widths in the vertical direction.

6. A feeding network reconfiguration method, comprising:
connecting an antenna array and K radio frequency channels via a reconfigurable network circuit;
dividing L antenna subarrays in the antenna array into M antenna subarray groups, and separately connecting the M antenna subarray groups to the K radio frequency channels, wherein one polarization direction of one antenna subarray group is connected to one radio frequency channel, L is a positive integer greater than 1, M is a positive integer, and K is an integer multiple of M; and any one of the K radio frequency channels is configured to perform signal processing on a signal received by a connected antenna subarray group and/or a to-be-transmitted signal; and
adjusting a mapping relationship between an antenna subarray group connected to at least one of the K radio frequency channels and the antenna subarrays.

7. The method according to claim 6, wherein the adjusting a mapping relationship between an antenna subarray group connected to at least one of the K radio frequency channels and the antenna subarrays comprises:
adjusting a quantity X of antenna subarray groups in a horizontal direction connected to the K radio frequency channels, wherein beams generated in a same polarization direction of the X antenna subarray groups in the horizontal direction comprise E directions in the horizontal direction, both X and E are positive integers, and $1 \leq E \leq X \leq M$.

8. The method according to claim 6, wherein the adjusting a mapping relationship between an antenna subarray group connected to at least one of the K radio frequency channels and the antenna subarrays comprises:
adjusting a quantity Y of antenna subarray groups in a vertical direction connected to the K radio frequency channels, wherein beams generated in a same polarization direction of the Y antenna subarray groups in the vertical direction comprise F directions in the vertical direction, both Y and F are positive integers, and $1 \leq F \leq Y \leq M$.

9. The method according to claim 6, wherein the adjusting a mapping relationship between an antenna subarray group connected to at least one of the K radio frequency channels and the antenna subarrays comprises:
adjusting a quantity of antenna subarrays in the horizontal direction comprised in the antenna subarray group connected to the at least one of the K radio frequency channels, wherein beams generated by antenna subarray groups that comprise different quantities of antenna subarrays in the horizontal direction have different widths in the horizontal direction.

10. The method according to claim 6, wherein the adjusting a mapping relationship between an antenna subarray group connected to at least one of the K radio frequency channels and the antenna subarrays comprises:
adjusting a quantity of antenna subarrays in the vertical direction comprised in the antenna subarray group connected to the at least one of the K radio frequency channels, wherein beams generated by antenna subarray groups that comprise different quantities of antenna subarrays in the vertical direction have different widths in the vertical direction.

11. A non-transitory computer-readable medium storing program for use by an apparatus, wherein the program comprises instructions that, when executed by a processor, cause the process to control the apparatus to perform:
connecting an antenna array and K radio frequency channels via a reconfigurable network circuit;
dividing L antenna subarrays in the antenna array into M antenna subarray groups, and separately connecting the M antenna subarray groups to the K radio frequency channels, wherein one polarization direction of one antenna subarray group is connected to one radio frequency channel, L is a positive integer greater than 1, M is a positive integer, and K is an integer multiple of M; and any one of the K radio frequency channels is configured to perform signal processing on a signal received by a connected antenna subarray group and/or a to-be-transmitted signal; and
adjusting a mapping relationship between an antenna subarray group connected to at least one of the K radio frequency channels and the antenna subarrays.

12. The non-transitory computer-readable medium according to claim 11, wherein the program further comprises instructions for:
adjusting a quantity X of antenna subarray groups in a horizontal direction connected to the K radio frequency channels, wherein beams generated in a same polarization direction of the X antenna subarray groups in the horizontal direction comprise E directions in the horizontal direction, both X and E are positive integers, and $1 \leq E \leq X \leq M$.

13. The non-transitory computer-readable medium according to claim 11, wherein the program further comprises instructions for:
adjusting a quantity Y of antenna subarray groups in a vertical direction connected to the K radio frequency channels, wherein beams generated in a same polarization direction of the Y antenna subarray groups in the vertical direction comprise F directions in the vertical direction, both Y and F are positive integers, and $1 \leq F \leq Y \leq M$.

14. The non-transitory computer-readable medium according to claim 11, wherein the program further comprises instructions for:
- adjusting a quantity of antenna subarrays in the horizontal direction comprised in the antenna subarray group connected to the at least one of the K radio frequency channels, wherein beams generated by antenna subarray groups that comprise different quantities of antenna subarrays in the horizontal direction have different widths in the horizontal direction.

15. The non-transitory computer-readable medium according to claim 11, wherein the program further comprises instructions for:
- adjusting a quantity of antenna subarrays in the vertical direction comprised in the antenna subarray group connected to the at least one of the K radio frequency channels, wherein beams generated by antenna subarray groups that comprise different quantities of antenna subarrays in the vertical direction have different widths in the vertical direction.

* * * * *